US012700625B2

(12) United States Patent
Kwag

(10) Patent No.: US 12,700,625 B2
(45) Date of Patent: *Aug. 4, 2026

(54) BATTERY PACK INCLUDING A CASE WITH FIRST AND SECOND SEALING MEMBERS

(71) Applicant: SAMSUNG SDI CO., LTD., Yongin-si (KR)

(72) Inventor: Nohyun Kwag, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/185,269

(22) Filed: Mar. 16, 2023

(65) Prior Publication Data

US 2023/0223614 A1     Jul. 13, 2023

Related U.S. Application Data

(63) Continuation of application No. 16/596,503, filed on Oct. 8, 2019, now Pat. No. 11,749,848.

(30) Foreign Application Priority Data

Oct. 8, 2018    (KR) ........................ 10-2018-0119748

(51) Int. Cl.
H01M 10/60          (2014.01)
B60L 50/64          (2019.01)
(Continued)

(52) U.S. Cl.
CPC ........... H01M 10/613 (2015.04); B60L 50/64 (2019.02); H01M 10/625 (2015.04);
(Continued)

(58) Field of Classification Search
CPC .. H01M 50/64; H01M 50/278; H01M 50/289; H01M 50/224; H01M 50/213;
(Continued)

(56) References Cited

U.S. PATENT DOCUMENTS 5,578,392 A     11/1996  Kawamura
6,379,837 B1    4/2002   Takahashi et al.
(Continued)

FOREIGN PATENT DOCUMENTS

CN        101192653 A     6/2008
CN          1905267 B    12/2010
(Continued)

OTHER PUBLICATIONS

Abstract of JP 2008-251471) Morita et al, "Packed Battery", 2008.*
(Continued)

*Primary Examiner* — Raymond Alejandro
(74) *Attorney, Agent, or Firm* — Womble Bond Dickinson (US) LLP

(57)          ABSTRACT

A battery pack includes: battery cells each including first and second end portions that are opposite each other in a length direction; a case providing an accommodation space in which each battery cell and a cooling fluid for cooling the battery cell are located, the case including a first cover covering the first end portion of the battery cell, the first cover including a first terminal hole through which the first end portion of the battery cell is partially exposed; and first and second sealing members adjacent to the first portion of the battery cell, the first and second sealing members surrounding the first terminal hole and configured to prevent cooling fluid leaving the accommodation space through the first terminal hole, where an end of an insulative layer is between the first terminal hole and the second sealing member.

8 Claims, 12 Drawing Sheets

(51) Int. Cl.

| | |
|---|---|
| *H01M 10/613* | (2014.01) |
| *H01M 10/625* | (2014.01) |
| *H01M 10/656* | (2014.01) |
| *H01M 10/6568* | (2014.01) |
| *H01M 10/66* | (2014.01) |
| *H01M 50/186* | (2021.01) |
| *H01M 50/213* | (2021.01) |
| *H01M 50/224* | (2021.01) |
| *H01M 50/271* | (2021.01) |
| *H01M 50/278* | (2021.01) |
| *H01M 50/289* | (2021.01) |

(52) U.S. Cl.

CPC ..... *H01M 10/656* (2015.04); *H01M 10/6568* (2015.04); *H01M 10/66* (2015.04); *H01M 50/186* (2021.01); *H01M 50/213* (2021.01); *H01M 50/224* (2021.01); *H01M 50/271* (2021.01); *H01M 50/278* (2021.01); *H01M 50/289* (2021.01); *H01M 2220/20* (2013.01)

(58) Field of Classification Search

CPC ............. H01M 50/271; H01M 50/183; H01M 50/184; H01M 50/186; H01M 50/188; H01M 50/204; H01M 50/20; H01M 10/613; H01M 10/617; H01M 10/625; H01M 10/656; H01M 10/6566; H01M 10/6568; H01M 10/66; H01M 2220/20; B60L 50/64

See application file for complete search history.

(56) References Cited

U.S. PATENT DOCUMENTS

| | | | |
|---|---|---|---|
| 7,924,562 | B2 | 4/2011 | Soma et al. |
| 8,841,018 | B2 | 9/2014 | Nakano et al. |
| 9,105,900 | B2 | 8/2015 | Kano |
| 9,236,585 | B2 | 1/2016 | Nishikawa et al. |
| 9,406,983 | B2 | 8/2016 | Mingers et al. |
| 9,515,361 | B2 | 12/2016 | Harada et al. |
| 9,660,231 | B2 | 5/2017 | Yoon |
| 9,847,182 | B2 | 12/2017 | Kusaba et al. |
| 10,065,523 | B2 | 9/2018 | Wood et al. |
| 10,347,881 | B2 * | 7/2019 | Han .................... H01M 50/209 |
| 10,411,233 | B2 | 9/2019 | Yoon et al. |
| 10,944,138 | B2 | 3/2021 | Hong et al. |
| 11,081,894 | B2 | 8/2021 | Cheon et al. |
| 11,183,730 | B2 | 11/2021 | Nakamura et al. |
| 11,362,390 | B2 | 6/2022 | Kwag |
| 11,749,848 | B2 * | 9/2023 | Kwag ................. H01M 50/186 |
| | | | 429/174 |
| 2002/0012833 | A1 | 1/2002 | Gow et al. |
| 2007/0026303 | A1 | 2/2007 | Jeon et al. |
| 2008/0131767 | A1 | 6/2008 | Kim |
| 2008/0311468 | A1 | 12/2008 | Hermann et al. |
| 2009/0059528 | A1 | 3/2009 | Damsohn et al. |
| 2009/0202897 | A1 | 8/2009 | Kim et al. |
| 2011/0008667 | A1 | 1/2011 | Kwag et al. |
| 2011/0027631 | A1 | 2/2011 | Koenigsmann |
| 2011/0165446 | A1 | 7/2011 | Hermann |
| 2011/0195284 | A1 | 8/2011 | Tasui et al. |
| 2011/0305930 | A1 | 12/2011 | Han |
| 2012/0251872 | A1 | 10/2012 | Kim |
| 2012/0315507 | A1 | 12/2012 | Kim |
| 2013/0136965 | A1 | 5/2013 | Nakano et al. |
| 2014/0093755 | A1 | 4/2014 | Houchin-Miller et al. |
| 2015/0056487 | A1 | 2/2015 | Kobayashi et al. |
| 2015/0118530 | A1 | 4/2015 | Lee |
| 2015/0255225 | A1 | 9/2015 | Kusaba et al. |
| 2016/0172727 | A1 | 6/2016 | Chan et al. |
| 2017/0025717 | A1 | 1/2017 | Zeller et al. |
| 2018/0301771 | A1 | 10/2018 | Jennrich et al. |
| 2019/0067655 | A1 | 2/2019 | Nakamura et al. |
| 2019/0379213 | A1 | 12/2019 | Cheon et al. |
| 2020/0044200 | A1 | 2/2020 | Ochs et al. |
| 2020/0112000 | A1 | 4/2020 | Kwag |
| 2020/0112007 | A1 | 4/2020 | Kwag |
| 2020/0127350 | A1 | 4/2020 | Lee et al. |

FOREIGN PATENT DOCUMENTS

| | | | | |
|---|---|---|---|---|
| CN | 102324770 | A | 1/2012 | |
| CN | 202550023 | U | 11/2012 | |
| CN | 202797123 | A | 3/2013 | |
| CN | 103247766 | A | 8/2013 | |
| CN | 103563124 | A | 2/2014 | |
| CN | 104471784 | A | 3/2015 | |
| CN | 105118937 | A | 12/2015 | |
| CN | 105489796 | A | 4/2016 | |
| CN | 106169544 | A | 11/2016 | |
| CN | 107170945 | A | 9/2017 | |
| CN | 107394315 | A | 11/2017 | |
| CN | 207116551 | U | 3/2018 | |
| CN | 207183378 | U | 4/2018 | |
| CN | 210897381 | U | 6/2020 | |
| CN | 210956735 | U | 7/2020 | |
| CN | 210956830 | U | 7/2020 | |
| CN | 211062826 | U | 7/2020 | |
| DE | 102008010820 | A1 | 8/2009 | |
| DE | 102008059967 | A1 | 10/2010 | |
| DE | 102009035487 | A1 | 2/2011 | |
| DE | 10-2016-219302 | A1 | 4/2018 | |
| EP | 2302726 | A1 | 3/2011 | |
| EP | 2357688 | A1 | 8/2011 | |
| EP | 2866295 | A1 | 4/2015 | |
| EP | 3217452 | A1 | 9/2017 | |
| JP | 1999-67178 | A | 3/1999 | |
| JP | 2001-313090 | A | 11/2001 | |
| JP | 4025928 | B2 | 10/2007 | |
| JP | 2008251471 | A * | 10/2008 | ............. H01M 2/10 |
| JP | 2010-97836 | A | 4/2010 | |
| JP | 4631118 | B2 | 11/2010 | |
| JP | 4791076 | B2 | 7/2011 | |
| JP | 5057720 | B2 | 8/2012 | |
| JP | 5173227 | B2 | 1/2013 | |
| JP | 2013-114780 | A | 6/2013 | |
| JP | 2014-197452 | A | 10/2014 | |
| JP | 2015/133266 | A | 7/2015 | |
| JP | WO2017/175487 | A1 | 10/2017 | |
| JP | 2017-536658 | A | 12/2017 | |
| KR | 10-2010-0057691 | A | 5/2010 | |
| KR | 10-2012-0082579 | A | 7/2012 | |
| KR | 10-2013-0035200 | A | 4/2013 | |
| KR | 10-2013-0127815 | A | 11/2013 | |
| KR | 10-2015-0054532 | A | 5/2015 | |
| KR | 10-2015-0070241 | A | 6/2015 | |
| KR | 10-2017-0018448 | A | 2/2017 | |
| KR | 10-2017-0106933 | A | 9/2017 | |
| KR | 10-2018-0063113 | A | 6/2018 | |
| KR | 10-2018-0092191 | A | 8/2018 | |
| WO | WO 2013/018151 | A1 | 2/2013 | |
| WO | WO 2013/124889 | A1 | 8/2013 | |
| WO | WO 2015/094035 | A1 | 6/2015 | |
| WO | WO 2016/185970 | A1 | 11/2016 | |
| WO | WO 2017/069397 | A1 | 4/2017 | |
| WO | WO 2017/175487 | A1 | 10/2017 | |
| WO | WO 2018/147545 | A1 | 8/2018 | |

OTHER PUBLICATIONS

Chinese Notice of Allowance dated Jan. 18, 2023 issued in corresponding Chinese Patent Application No. 201910949727.7 (4 pages).
Chinese Notice of Allowance dated Jan. 18, 2023 issued in corresponding Chinese Patent Application No. 201910950782.8 (4 pages).
Chinese Office action (with English translation) for CN Application No. 201910949797.2 dated Nov. 1, 2022, 7 pages.
Chinese Office action dated Apr. 24, 2022 issued in corresponding CN Application No. 201910949727.7, 6 pages.
Chinese Office action dated Apr. 29, 2022 issued in corresponding CN Application No. 201910949797.2, with English translation, 25 pages.

(56) References Cited

OTHER PUBLICATIONS

Chinese Office action dated Aug. 2, 2022 issued in corresponding CN Application No. 201910950782.8, with English translation, 14 pages.
Chinese Office action dated May 7, 2022 issued in corresponding CN Application No. 201910949820.8, with English translation, 22 pages.
Chinese Office action dated Nov. 1, 2022 issued in corresponding CN Application No. 201910949797.2, with English translation, 7 pages.
Chinese Office action, with English translation, dated Nov. 11, 2022 issued in Chinese Patent Application No. 201910949820.8 (15 pages).
English Translation of Chinese Office action dated Apr. 24, 2022 issued in corresponding CN Application No. 201910949727.7, 6 pages.
EPO European Office Action dated Jan. 30, 2023 issued in corresponding European Patent Application No. 19202070.9 (4 pages).
EPO Extended European Search Report dated Aug. 4, 2020, issued in European Patent Application No. 19202014.7, 12 pages.
EPO Extended Search Report dated Apr. 17, 2020, corresponding to European Patent Application No. 19202074.1, 5 pages.
EPO Extended Search Report dated Feb. 28, 2020 corresponding to European Patent Application No. 19202039.4, 5 pages.
EPO Extended Search Report dated Feb. 28, 2020 for corresponding European Patent Application No. 19202070.9, 8 pages.
EPO Extended Search Report dated Mar. 20, 2020 corresponding to European Patent Application No. 19202014.7, 15 pages.
European Communication mailed Dec. 10, 2020 in corresponding European Application No. 19202070.9, European Communication mailed Dec. 10, 2020, 5 pages.
Korean Office action dated Nov. 26, 2019 issued in KR Patent Application No. 10-2018-0123928, 56 pages.
Korean Office action dated Oct. 5, 2020 issued in KR Patent Application No. 10-2020-0099831, 11 pages.
Metals 2020, 10, 1315; doi: 10.3390/met 10101315 (Year:2016).
Notice of Allowance dated Aug. 24, 2022 issued in U.S. Appl. No. 16/595,906, 9 pages.
Notice of Allowance dated Nov. 9, 2022 issued in U.S. Appl. No. 16/595,900, 13 pages.
Notice of Allowance for U.S. Appl. No. 16/595,900 dated Nov. 9, 2022, 13 pages.
Office Action for U.S. Appl. No. 16/595,900 dated May 18, 2022, 18 pages.
Translation DE 102008010820 (Year: 2021).
Translation DE 102008059967 (Year: 2021).
Translation DE 102009035487 (Year: 2021).
U.S. Final Office action dated Sep. 29, 2021 issued in U.S. Appl. No. 16/595,906, 36 pages.
U.S. Notice of Allowance dated Jan. 12, 2022 issued in U.S. Appl. No. 16/596,583, 7 pages.
U.S. Notice of Allowance dated Mar. 17, 2022 issued in U.S. Appl. No. 16/595,906, 9 pages.
U.S. Office Action dated Aug. 20, 2021 issued in U.S. Appl. No. 16/596,583, 13 pages.
U.S. Office action dated May 4, 2021 issued in U.S. Appl. No. 16/595,906, 30 pages.
U.S. Restriction Requirement dated Dec. 13, 2021 issued in U.S. Appl. No. 16/595,900, 6 pages.
US Notice of Allowance dated Dec. 21, 2022 issued in U.S. Appl. No. 16/595,906 (8 pages).
US Notice of Allowance dated Feb. 28, 2023 issued in U.S. Appl. No. 16/595,900 (12 pages).
Korean Office Action dated Apr. 27, 2023, issued in Korean Patent Application No. 10-2018-0119750 (4 pages).
Korean Office Action dated Nov. 6, 2023, issued in Korean Patent Application No. 10-2018-0119748 (50 pages).
US Office Action dated Oct. 17, 2023, issued in U.S. Appl. No. 18/179,268 (9 pages).
Chinese Office Action with English translation for CN Application No. 201910949820.8 dated Feb. 11, 2023, 7 pages.
US Final Office Action dated Apr. 16, 2024, issued in U.S. Appl. No. 18/179,268 (12 pages).
European Office Action dated Jun. 25, 2024, issued in European Patent Application No. 19202014.7 (5 pages).
US Office Action dated Aug. 7, 2024, issued in U.S. Appl. No. 18/179,268 (12 pages).
U.S. Non-Final Office Action dated Nov. 22, 2024, issued in corresponding U.S. Appl. No. 18/353,823 (20 pages).
U.S. Final Office Action dated Apr. 24, 2025, issued in corresponding U.S. Appl. No. 18/353,823 (10 pages).
U.S. Notice of Allowance dated Mar. 19, 2025, issued in corresponding U.S. Appl. No. 18/179,268 (9 pages).
Korean Office Action dated Nov. 6, 2023, issued in corresponding Korean Patent Application No. 10-2018-0119749 (7 pages).
European Office Action corresponding to EP Application No. 19202070. 9, dated Jan. 30, 2026 (5 pages).

* cited by examiner

BATTERY PACK INCLUDING A CASE WITH FIRST AND SECOND SEALING MEMBERS

CROSS-REFERENCE TO RELATED APPLICATION(S)

This application is a continuation of U.S. patent application Ser. No. 16/596,503, filed on Oct. 8, 2019, now U.S. Pat. No. 11,749,848, issued Sep. 5, 2023, which claims priority to and the benefit of Korean Patent Application No. 10-2018-0119748, filed on Oct. 8, 2018, in the Korean Intellectual Property Office, the entire disclosure of which is hereby incorporated by reference. This application also incorporates by reference the entirety of each of U.S. application Ser. No. 16/596,583, filed on Oct. 8, 2019 and issued as U.S. Pat. No. 11,362,390, U.S. application Ser. No. 16/595,906, filed on Oct. 8, 2019 and now pending, and U.S. application Ser. No. 16/595,900, filed on Oct. 8, 2019 and now pending.

BACKGROUND

1. Field

One or more embodiments relate to a battery pack.

2. Description of the Related Art

In general, secondary batteries are configured to be rechargeable, unlike primary batteries which are not configured to be rechargeable. Secondary batteries are used as energy sources of devices such as mobile devices, electric vehicles, hybrid electric vehicles, electric bicycles, and uninterruptible power supplies. Single-cell secondary batteries or multi-cell secondary batteries (secondary battery packs) in which a plurality of battery cells are electrically connected are used according to the types of external devices that use the secondary batteries.

Small mobile devices such as cellular phones may be operated for a predetermined time using single-cell secondary batteries. However, multi-cell secondary batteries (secondary battery packs) having high-output, high-capacity features may be suitable for devices having long operating times and requiring high power such as electric vehicles or hybrid electric vehicles consuming large amounts of power. The output voltage or current of a battery pack may be increased by adjusting the number of batteries (battery cells) included in the battery pack.

SUMMARY

One or more embodiments include a battery pack having an accommodation space in which a flow of a cooling fluid making direct contact with battery cells is induced to improve heat dissipation.

One or more embodiments include a battery pack having a cooling fluid sealing structure to prevent leakage of a cooling fluid from an accommodation space in which battery cells are accommodated.

Additional aspects will be set forth in part in the description which follows and, in part, will be apparent from the description, or may be learned by practice of the presented embodiments.

According to one or more embodiments, a battery pack includes: a plurality of battery cells each including a first end portion and a second end portion that are opposite each other in a length direction of the respective battery cell; a case having an accommodation space in which each of the battery cells is located, the accommodation space being configured to contain a cooling fluid for cooling the plurality of battery cells, the case including a first cover covering the first end portion of a battery cell of the battery cells, the first cover including a first terminal hole through which the first end portion of the battery cell is exposed; and first and second sealing members surrounding the first terminal hole configured to prevent cooling fluid leaving the accommodation space through the first terminal hole.

The first and second sealing members may have a ring shape to surround the first terminal hole.

A gap between a portion of the first cover and a portion of the first end portion of the battery cell that face each other may be sealed outside the circumference of the first terminal hole by the first and second sealing members.

The first sealing member and the first cover may be formed as a single piece.

The first sealing member and the first cover may be formed as a single piece by insert molding, and the first sealing member may include: a subsurface portion that is below the surface of the first cover; and a protruding portion that protrudes from the surface of the first cover.

The subsurface portion may be coupled with a coupling groove of the first cover.

The subsurface portion may have a width which gradually increases as the subsurface portion extends in a recessed direction of the coupling groove.

The first sealing member may be around the first terminal hole, and the second sealing member may be between the first terminal hole and the first sealing member in a radial direction of the first terminal hole.

The second sealing member may be in a filling space between the first sealing member and a barrier rib surrounding the first terminal hole.

The filling space may be between the barrier rib, the first sealing member, the first cover, and the first end portion of the battery cell.

The barrier rib may protrude toward the first end portion of the battery cell and obstruct a gap between the first cover and the first end portion of the battery cell.

An injection hole connected to the filling space may be in the first cover.

The second sealing member may be in at least a portion of the injection hole.

An insulative layer may be on an outer surface of the battery cell to provide electrical insulation between the battery cell and the cooling fluid.

The insulative layer may extend to have an end on the first end portion of the battery cell.

The end of the insulative layer may be between the first terminal hole and the second sealing member in a radial direction of the first terminal hole.

The battery pack may further include a barrier rib having an inner side and an outer side in the radial direction of the first terminal hole, the inner side surrounding the first terminal hole, the outer side making contact with the second sealing member.

The end of the insulative layer may be within a thickness of the barrier rib.

The case may further include a second cover covering the second end portion of the battery cell, and the second cover may include a second terminal hole through which the second end portion of the battery cell may be exposed, wherein the battery pack may further include other first and second sealing members surrounding the second terminal hole configured to prevent cooling fluid leaving the accommodation space through the second terminal hole.

The case may further include a middle case between the first and second covers; a first laser weld zone may be between the middle case and the first cover; and a second laser weld zone may be between the middle case and the second cover.

An inlet and an outlet for introducing and discharging the cooling fluid may be on the case, and the accommodation space of the case may accommodate a flow of the cooling fluid making direct contact with the battery cells.

The exposed first end portion of the battery cell may include a terminal of the battery cell.

The case may be configured to receive the cooling fluid from a motor vehicle cooling system, and the battery pack may be configured to power the motor vehicle.

According to one or more other embodiments, a method of assembling a battery pack, the battery pack including a first cover of a case and a plurality of battery cells to be located in the case, includes: providing the first cover having a first sealing member; coupling a battery cell of the battery cells to the first cover, the first cover having a first terminal hole through which a first end portion of the battery cell is exposed, the first sealing member surrounding the first terminal hole; and providing a second sealing member between the first cover and the first end portion of the battery cell, the second sealing member surrounding the first terminal hole and being between the first terminal hole and the first sealing member, the first and second sealing members being configured to prevent cooling fluid leaving the accommodation space through the first terminal hole.

BRIEF DESCRIPTION OF THE DRAWINGS

These and other aspects will become apparent and more readily appreciated from the following description of the embodiments, taken in conjunction with the accompanying drawings, in which:

FIG. 10 is a bottom view illustrating a flow of a cooling fluid in the case shown in FIG. 9;

FIG. 12 is a partially exploded perspective view illustrating a housing accommodating a core pack shown in FIG. 11, according to another embodiment of the present disclosure.

DETAILED DESCRIPTION

Figure 1:
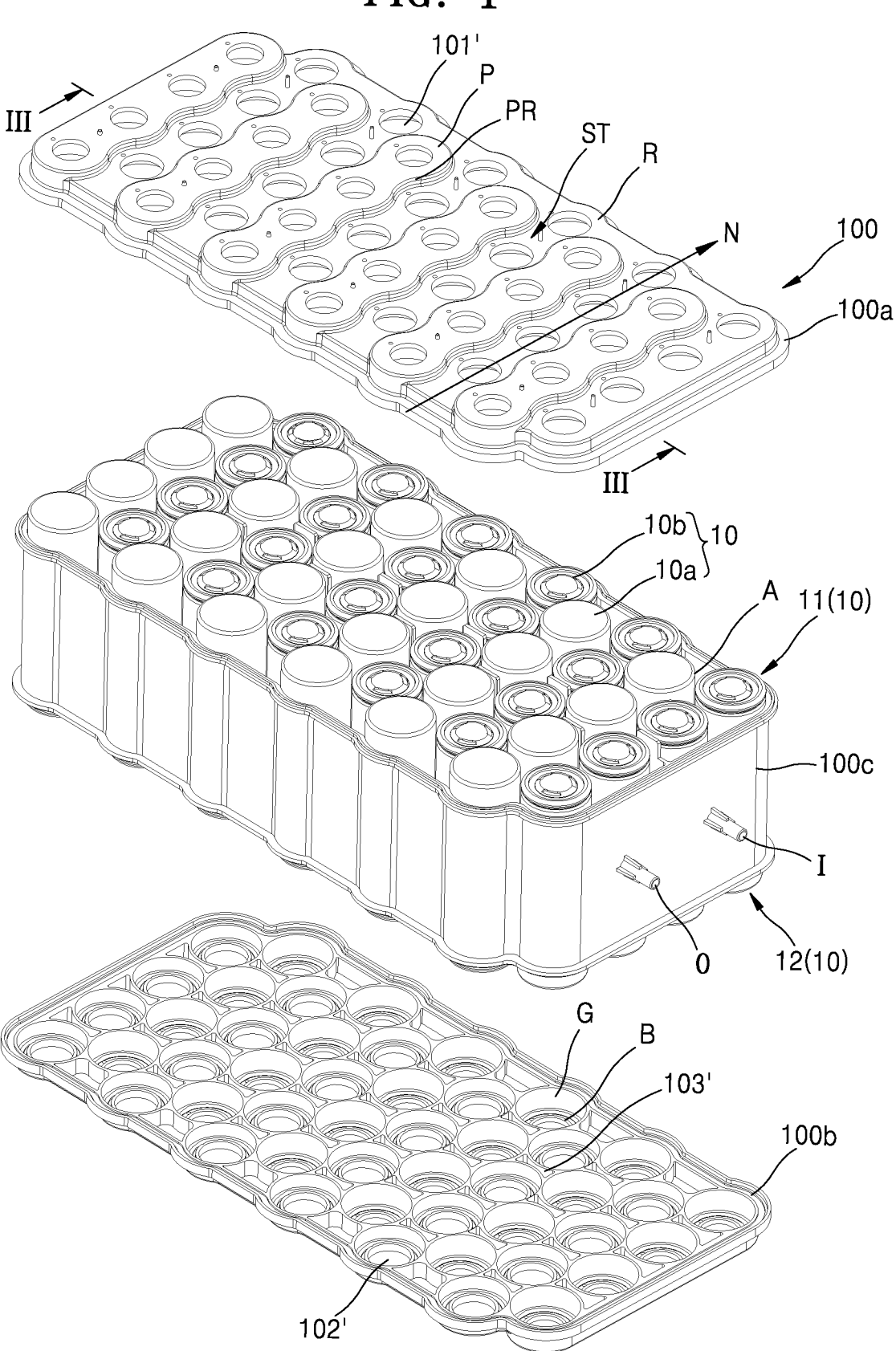
FIG. 1 is an exploded perspective view illustrating a battery pack according to an embodiment of the present disclosure.

Reference will now be made in detail to embodiments, examples of which are illustrated in the accompanying drawings, wherein like reference numerals refer to like elements throughout unless otherwise noted. Rather, these embodiments are provided as examples so that this disclosure will be thorough and complete, and will fully convey the aspects and features of the present invention to those skilled in the art. In this regard, the present embodiments may have different forms and should not be construed as being limited to the descriptions set forth herein. Accordingly, the embodiments are merely described below, by referring to the figures, to explain aspects of the present description. Moreover, processes, elements, and techniques that are not necessary to those having ordinary skill in the art for a complete understanding of the aspects and features of the present invention may not be described. In the drawings, the relative sizes of elements, layers, and regions may be exaggerated for clarity.

It will be understood that, although the terms "first," "second," "third," etc., may be used herein to describe various elements, components, regions, layers, and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "lower," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as being "lower" relative to other elements or features would then be oriented as "upper" relative to the other elements or features. Thus, the example terms "lower" and "upper" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." In addition, the use of alternative language, such as "or," when describing embodiments of the present invention, refers to "one or more embodiments of the present invention" for each corresponding item listed. As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Battery packs will now be described with reference to the accompanying drawings, in which embodiments of the present disclosure are shown.

Figure 2A:
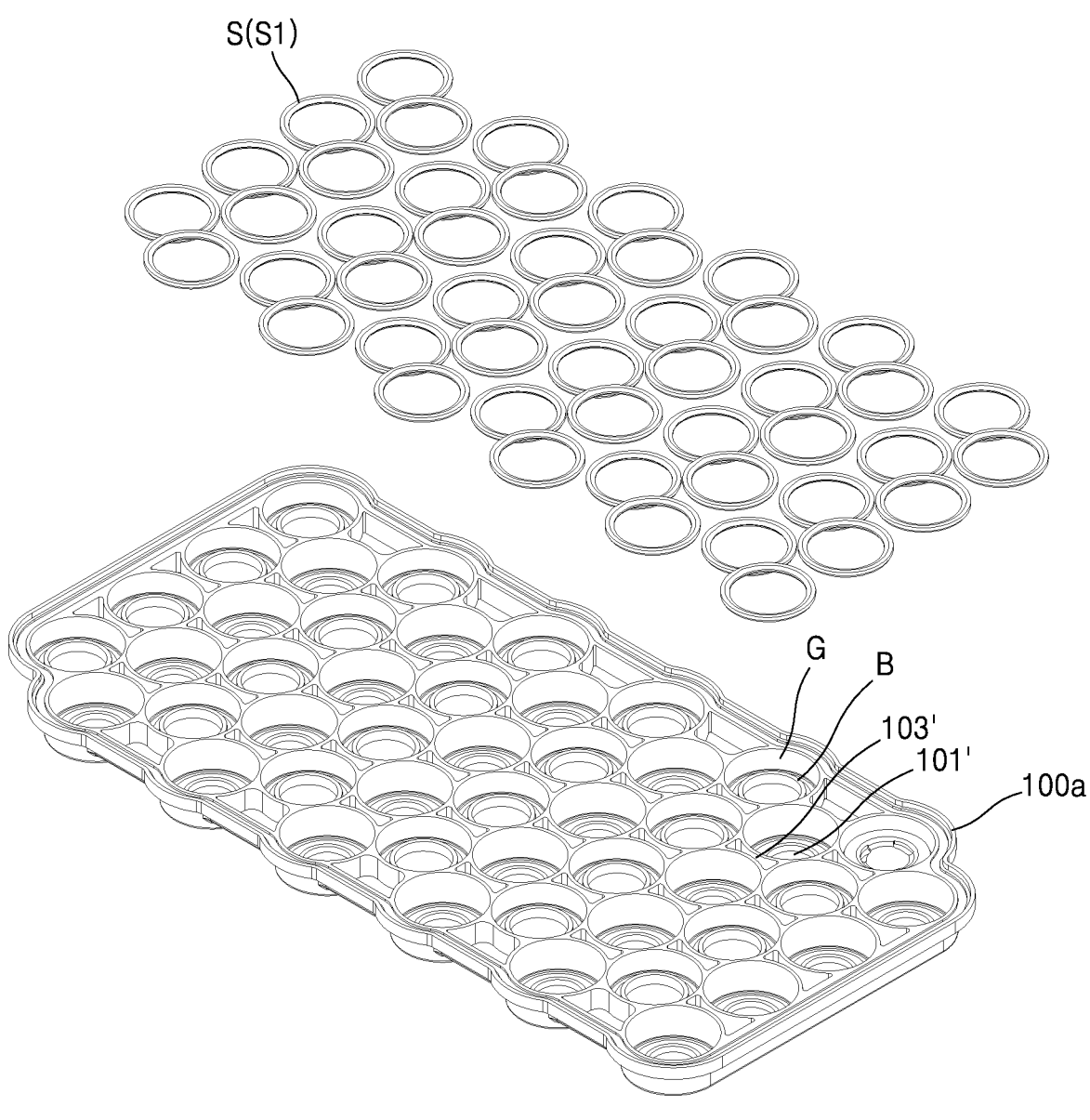
FIG. 2A is an exploded perspective view illustrating a lower side of a first cover shown in FIG. 1.
Figure 2B:
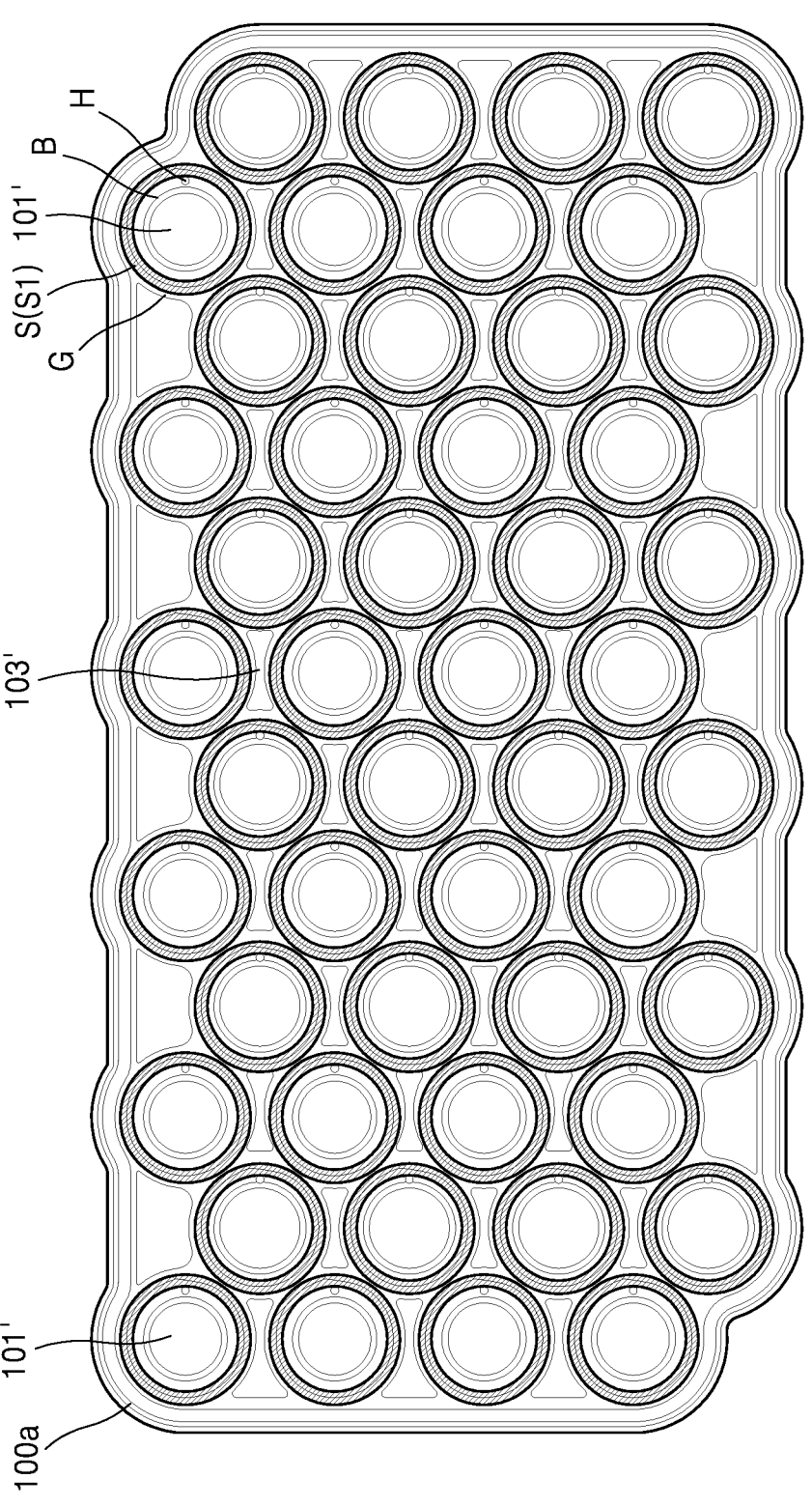
FIG. 2B is a plan view illustrating a lower side of the first cover shown in FIG. 1.

FIG. 1 is an exploded perspective view illustrating a battery pack according to an embodiment of the present disclosure. FIG. 2A is an exploded perspective view and FIG. 2B is a plan view illustrating a lower side of a first cover 100a shown in FIG. 1.

Referring to FIG. 1, a battery pack according to embodiments of the present disclosure may include a plurality of battery cells 10 and a case 100 providing an accommodation space A in which the battery cells 10 and a cooling fluid for cooling the battery cells 10 may be located (e.g., are accommodated).

The case 100 may hermetically contain the cooling fluid for cooling the battery cells 10 (except, e.g., at the inlet I and the outlet O, described below), and the accommodation space A filled with the cooling fluid may be sealed to prevent leakage of the cooling fluid from inside of the accommodation space A, or may reduce the likelihood thereof.

The case 100 may include a first cover 100a and a second cover 100b which respectively cover a first end portion 11 and a second end portion 12 of the battery cells 10 corresponding to both (or opposite) ends of the battery cells 10 in a length direction of the battery cells 10. First terminal holes 101' and second terminal holes 102' may be formed in the first and second covers 100a and 100b, respectively, to expose the first and second end portions 11 and 12 of the battery cells 10, respectively, therethrough, and the battery cells 10 may be electrically connected to each other through the first and second end portions 11 and 12 exposed through the first and second terminal holes 101' and 102'.

The first and second terminal holes 101' and 102' may expose only center portions of the first and second end portions 11 and 12 of the battery cells 10 such that the first and second end portions 11 and 12 of the battery cells 10 may not pass through (e.g., completely pass through) the first and second terminal holes 101' and 102', and peripheral portions of the first and second end portions 11 and 12 may be covered with portions of the first and second covers 100a and 100b formed around the first and second terminal holes 101' and 102'.

Referring to FIGS. 1 and 2B, guide ribs G may be formed on the first and second covers 100a and 100b. The guide ribs G may define assembling positions of the battery cells 10 and may protrude from the first and second covers 100a and 100b toward (e.g., along) the first and second end portions 11 and 12 of the battery cells 10 to surround the first and second end portions 11 and 12 of the battery cells 10. The guide rib G of the first cover 100a may surround the first end portion 11 of a battery cell 10, and the guide rib G of the second cover 100b may surround the second end portion 12 of the battery cell 10 to delimit the assembling position of the battery cell 10, and the guide rib G of the first cover 100a and the guide rib G of the second cover 100b may thus be formed at positions corresponding to each other.

The guide ribs G surrounding the peripheries of the first and second end portions 11 and 12 of the battery cells 10 may be formed outside barrier ribs B (e.g., may circumferentially surround or be formed circumferentially around barrier ribs B) surrounding the first and second terminal holes 101' and 102', and the barrier ribs B and the guide ribs G that are located at outer sides relative to the first and second terminal holes 101' and 102' may extend (or protrude) in parallel to each other (or without intersect each other), e.g., in the shape of concentric circles, from the first and second covers 100a and 100b toward the first and second end portions 11 and 12 of the battery cells 10. While defining or regulating the assembling positions of the battery cells 10, the guide ribs G may fix sealing members S (refer to FIG. 2B or 3) in position from the outsides of the sealing members S (e.g., from the circumferential peripheries of the sealing members S) and may thus prevent movement or wobbling of the sealing members S, or reduce the likelihood thereof. Additional description of the barrier ribs B and the sealing members S may be provided further below.

The guide ribs G may have a ring shape to surround the peripheries of the first and second end portions 11 and 12 and may be arranged in rows in such a manner that guide ribs G of a row may be placed in valleys between guide ribs G of an adjacent row. That is, the guide ribs G in a given row may be set lower than the guide ribs G of the rows on either side of the given row. The guide ribs G may be formed at positions corresponding to the battery cells 10 that are arranged in such a manner that battery cells 10 of a given row are placed in a valley between battery cells 10 of the adjacent rows. Therefore, the guide ribs G may also be arranged in a pattern corresponding to the arrangement of the battery cells 10.

Gap portions 103' may be formed between the guide ribs. For example, a gap portion 103' may be formed between guide ribs G adjacent to each other and facing each other with a valley therebetween. For example, a gap portions 103' may be provided in a surplus space between four neighboring guide ribs G having adjacent peripheries.

The gap portions 103' may absorb tolerance of adjacent guide ribs G (e.g., may provide space for the adjacent guide ribs G), and as described later, the gap portions 103' may provide coupling positions for fixing the position of a barrier wall 150 (refer to FIG. 9) provided in the case 100. For example, the gap portions 103' of the first cover 100a may be formed at positions corresponding to the gap portions 103' of the second cover 100b to provide coupling positions for a barrier wall 150 (refer to FIG. 9) provided in the case 100.

The gap portions 103' may be thinner than the guide ribs G protruding from the first and second covers 100a and 100b to provide coupling positions to the barrier wall 150 (refer to FIG. 9) and prevent or reduce the likelihood of variations in the distance between adjacent guide ribs G caused by contraction of the gap portions 103' when a high-temperature molten resin is cooled to room temperature during an injection molding process.

Referring to FIGS. 2A and 2B, sealing members S may be arranged on the first cover 100a (or on a lower side of the first cover 100a). For example, the sealing members S may be arranged around the first terminal holes 101' to block cooling fluid leakage passages formed between the first cover 100a and the battery cells 10 through the first terminal holes 101'. Other sealing members S may be arranged around the second terminal holes 102' to block cooling fluid leakage passages formed between the first cover 100a and the battery cells 10 through the second terminal holes 102'. In the following description, the sealing members S arranged around the first terminal holes 101' are mainly described, but the sealing members S arranged around the second terminal holes 102' may have substantially the same technical aspects as the sealing members S arranged around the first terminal holes 101'.

The sealing members S may have a ring shape to continuously surround the first terminal holes 101'. In an embodiment of the present disclosure, a plurality of sealing members S (for example, first sealing members S1) may be individually provided around respective first terminal holes 101' to surround the first terminal holes 101', and the sealing members S (for example, the first sealing members S1) may be placed inside respective guide ribs G surrounding the first end portions 11 of the battery cells 10. In another embodiment of the present disclosure, a plurality of sealing members S (e.g., the first sealing members S1) may be connected to each other as a single sheet and the sealing members S (e.g., the first sealing members S1) may be simultaneously (or concurrently) aligned with the first terminal holes 101' through a single position arranging action.

Figure 3:
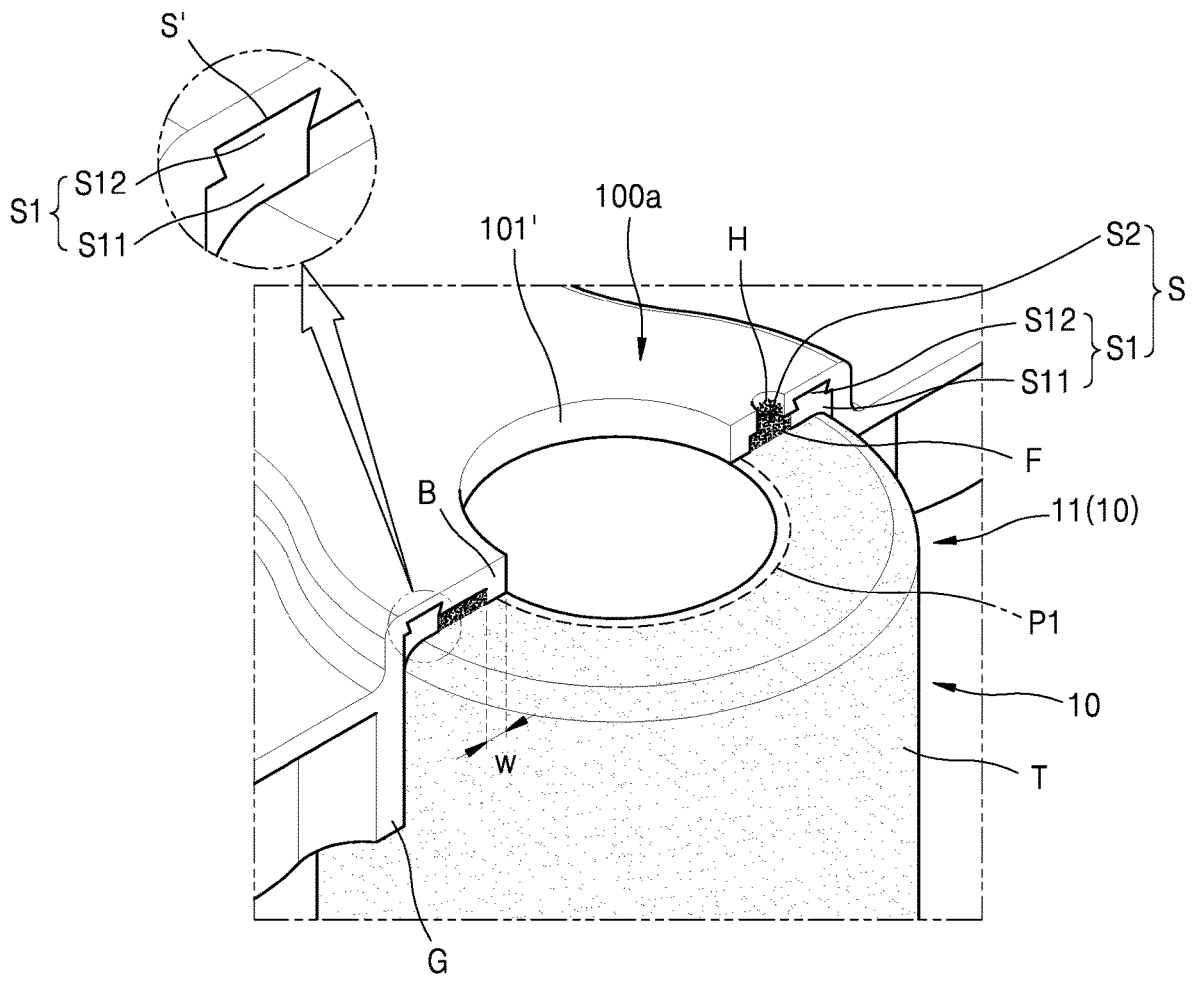
FIG. 3 is a cut-away view taken along the line III-III in FIG. 1.

FIG. 3 is a cut-away view taken along the line III-III in FIG. 1.

Referring to FIG. 3, the sealing members S may include the first sealing members S1 and second sealing members S2 around and/or surrounding (e.g., doubly surrounding) the first terminal holes 101' from outside the first terminal holes 101'. The first terminal holes 101' may be sealed by surrounding (e.g., doubly surrounding) the first terminal holes 101' with the first and second sealing members S1 and S2, and the first and second sealing members S1 and S2 may block (e.g., doubly block) gaps between the first cover 100a and the first end portions 11 of the battery cells 10 from outside the peripheries of the first terminal holes 101'.

The first and second sealing members S1 and S2 may have ring shapes to surround (or continuously surround) the first terminal holes 101'. For example, the first sealing members S1 may have a ring shape and may surround the first terminal holes 101' at relatively outer positions thereof, and the second sealing members S2 may have a ring shape and surround the first terminal holes 101' at relatively inner positions thereof. That is, the second sealing members S2 may be circumferentially inside the first sealing members S1, and the first terminal holes 101' may be inside the circumference of both the first sealing members S1 and the second sealing members S2.

The first sealing members S1 may have a preformed pattern and may be formed together with the first cover 100a by an insert molding method. In some embodiments, the first sealing members S1 may include an elastic material having high sealing characteristics, and the elastic material may be a rubber material such as ethylene propylene diene terpolymer or EPDM.

The first sealing members S1 may include protruding portions S11 protruding from the first cover 100a (e.g., from the surface of the first cover 100a). The first sealing members S1 are for blocking gaps between the first cover 100a and the first end portions 11 of the battery cells 10, and the protruding portions S11 of the first sealing members S1 may protrude from the first cover 100a and make contact with the battery cells 10 (first end portions 11 of the battery cells 10). For example, the protruding portions S11 may surround (or be around) the first terminal holes 101' and block cooling fluid leakage passages through the first terminal holes 101' formed between the first cover 100a and the battery cells 10, and to this end, the protruding portions S11 may protrude from the first cover 100a and may elastically contact the first end portions 11 of the battery cells 10, and may be pressured against the first end portions 11 of the battery cells 10.

As described above, portions of the first sealing members S1 may form the protruding portions S11 protruding from the first cover 100a and making contact with the first end portions 11 of the battery cells 10, and other portions of the first sealing members S1 (e.g., the remaining portions) may form subsurface portions S12 (e.g., buried portions) disposed in a coupling openings such as coupling grooves S' (hereinafter "coupling grooves S") formed in the first cover 100a for fixing the positions of the first sealing members S1. The protruding portions S11 and the subsurface portions S12 may adjoin each other to form first sides and second sides of the first sealing members S1.

The subsurface portions S12 and the coupling grooves S' of the first cover 100a may have complementary shapes for matching each other and may be fitted to each other to prevent separation. In some embodiments, the subsurface portions may have central portion and a distal portion which is wider than the central portion, and may be fitted into a groove S' with a corresponding shape (e.g., in a dovetail arrangement). For example, the subsurface portions S12 may have a width that gradually increases in a recessed direction of the coupling grooves S' (e.g., the direction extending away from the surface into the body of the cover 100a), and the widths of the subsurface portions S12 may increase in the recessed direction of the coupling grooves S' and may function as stop jaws preventing separation from the coupling grooves S'.

The subsurface portions S12 may be formed by an insert molding method in a state in which the subsurface portions S12 are located in (e.g., inserted in) the coupling grooves S' of the first cover 100a. For example, after the first sealing members S1 including the subsurface portions S12 having a distally-widening shape (e.g., a dovetail shape) are fixed to the inside of a mold in which a molten resin will be injected for forming the first cover 100a, the molten resin may be injected into the mold to form the first cover 100a having the coupling grooves S' matching the distally-widening shaped (e.g., dovetail-shaped) subsurface portions S12. Then, the subsurface portions S12 may be formed in a state in which the subsurface portions S12 are below the surface of (e.g., buried in) the coupling grooves S' of the first cover 100a.

The first and second sealing members S1 and S2 may surround the first terminal holes 101' from outside the first terminal holes 101' at different positions. For example, the first sealing members S1 may be around the outsides of the first terminal holes 101', and the second sealing members S2 may be placed between the first terminal holes 101' and the first sealing members S1 in a radial direction of the first terminal holes 101'.

In the present disclosure, the radial direction of the first terminal holes 101' does not necessarily indicate that the first terminal holes 101' have a circular shape. For example, the first terminal holes 101' may have any suitable shape, such as a circular shape or an elliptical shape, and the radial direction of the first terminal holes 101' may refer to a direction from the center of a first terminal hole 101' toward the outside of the first terminal hole 101'.

The second sealing members S2 may fill an area between the first terminal holes 101' and the first sealing members S1 and may include a material having fluidity variable by, e.g., heating. For example, the second sealing members S2 may be or include liquid or gel that is similar to liquid and may have sufficient fluidity for permeating into filling spaces F between the first terminal holes 101' and the first sealing members S1. As the second sealing members S2 cool to room temperature, the second sealing members S2 may solidify. The second sealing members S2 may include a material having fluidity variable by heat, pressure, or light having a particular wavelength band. For example, the fluidity of the material of the second sealing members S2 may be varied by various fluidity adjusting factors such as heating, pressurizing, or irradiation with light.

The barrier ribs B may be formed along the outsides of the first terminal holes 101' to prevent or reduce the likelihood of permeation of the second sealing members S2, having fluidity, past the barrier ribs B and into the first terminal holes 101'. For example, the barrier ribs B may protrude from the first cover 100a toward the first end portions 11 of the battery cells 10 to define the filling spaces F for the second sealing members S2 (e.g., in combination with the first cover 100a and the first sealing member 100) while preventing or reducing the likelihood of the second sealing members S2, having fluidity, from permeating into the first terminal holes 101' through gaps between the first cover 100a and the first end portions 11 of the battery cells 10. The barrier ribs B may be formed around the outsides of the first terminal holes 101'. For example, the barrier ribs B may surround or be around the first terminal holes 101' and define the first terminal holes 101'.

While defining the filling spaces F for the second sealing members S2 from outside the first terminal holes 101', the barrier ribs B may block cooling fluid leakage passages formed through the first terminal holes 101' (e.g., between the first cover 100a and the battery cells 10) together with the first and second sealing members S1 and S2. For example, because the barrier ribs B provide additional sealing portions surrounding the first terminal holes 101' in addition to the first and second sealing members S1 and S2, a triple sealing structure may be provided at the peripheries of the first terminal holes 101'.

The filling spaces F for the second sealing members S2 may be the space between the barrier ribs B and the first sealing members S1 in the radial direction of the first terminal holes 101' and between the first cover 100a and the first end portions 11 of the battery cells 10 in a direction penetrating the first terminal holes 101' (e.g., the axial direction of the first terminal holes 101'). For example, the filling spaces F for the second sealing members S2 may be formed in a doughnut shape around the peripheries of the first terminal holes 101'.

Injection holes H connected to the filling spaces F may be formed in the first cover 100a. For example, the injection holes H may be formed at positions on the first cover 100a between the barrier ribs B and the first sealing members S1 that form the filling spaces F. The second sealing members S2 may be introduced (e.g., injected) into the filling spaces F through the injection holes H to fill the filling spaces F and then the injection holes H. For example, the second sealing members S2 (or the material that will form the second sealing members S2 once positioned in the filling spaces F) may be pressurized to a given pressure and may be injected into the filling spaces F through the injection holes H to substantially fill the entire volume of the filling spaces F.

The first and second sealing members S1 and S2 may provide a double sealing structure at positions adjacent to each other in the radial direction of the first terminal holes 101'. However, the scope of the present disclosure is not limited thereto. For example, the sealing structure of the present disclosure may include multiple sealing portions having non-continuous boundaries in the radial direction of the first terminal holes 101' and arranged adjacent to each other. The leakage of the cooling fluid through the first terminal holes 101' may be reliably prevented or the likelihood thereof reduced by the multiple sealing structure which provides at least double sealing.

In the embodiment shown in FIG. 3, the second sealing members S2 may be liquid or of any form similar to liquid (or may start in such a form, e.g., during manufacturing/assembly and later be cured into a solid or solid-like state) and may be injected through the injection holes H formed in the first cover 100a. However, the scope of the present disclosure is not limited thereto. For example, instead of injecting the second sealing members S2 through the injection holes H, the second sealing members S2 may be formed in a preformed pattern and injection molded together with the first cover 100a (e.g., the second sealing members S2 can be formed through injection molding along with the first cover 100a or the first cover 100a can be injection molded around the second sealing members), or may be formed separately from the first cover 100a and may then be inserted into the first cover 100a.

Some first and second sealing members S1 and S2 may be arranged around the outsides of the first terminal holes 101', and other first and second sealing members S1 and S2 may be arranged around the outsides of the second terminal holes 102'. The first and second sealing members S1 and S2 around the second terminal holes 102' may block (e.g., doubly block) gaps between the second cover 100b and the second end portions 12 of the battery cells 10 from outside the second terminal holes 102'. For example, the first sealing members S1 may have a ring shape around or surrounding the outsides of the second terminal holes 102', and the second sealing members S2 may be in (e.g., filled in) filling spaces F defined by the barrier ribs B surrounding the second terminal holes 102' and the first sealing members S1 provided outside the barrier ribs B. The technical characteristics of the first and second sealing members S1 and S2 around the second terminal holes 102' are substantially the same as those described above around the first terminal holes 101'.

Figure 4A:
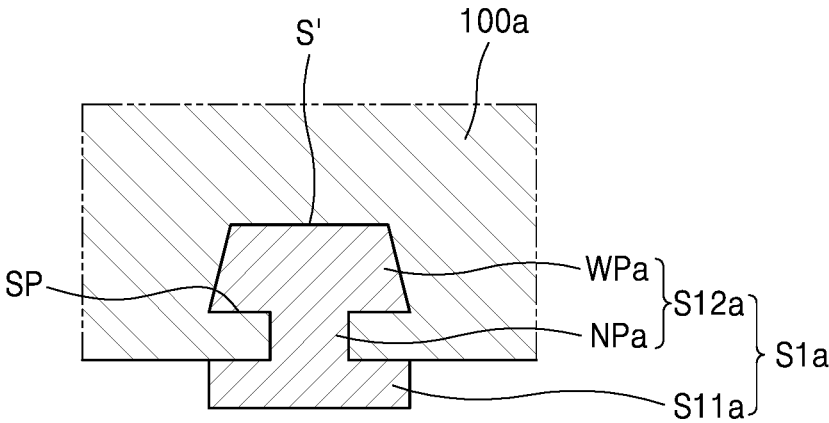
FIGS. 4A-4B are cross-sectional views illustrating modifications of a first sealing member shown in FIG. 3.
Figure 4B:
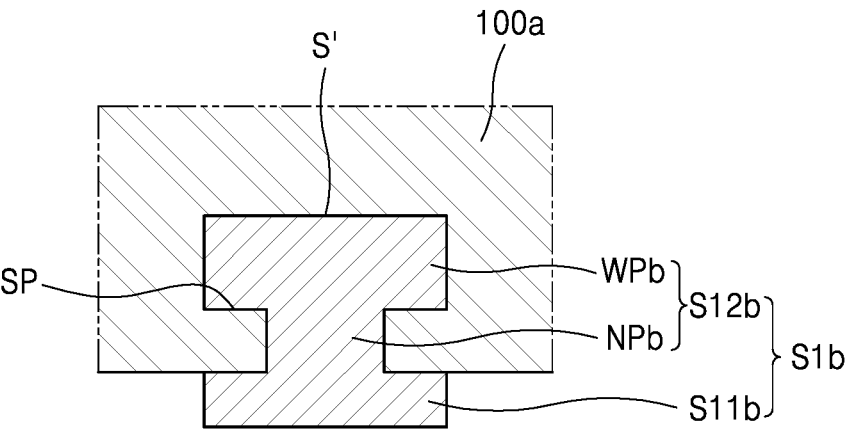

FIGS. 4A and 4B are cross-sectional views illustrating some embodiments of the first sealing member S1.

Referring to FIGS. 4A and 4B, first sealing members Sa and S1b may include: subsurface portions S12a and S12b below the surface of (e.g., buried in) the first cover 100a; and protruding portions S11*a* and S11*b* extending from the subsurface portions S12*a* and S12*b* and protruding from the first cover 100*a*. The subsurface portions S12*a* and S12*b* may have a shape complementary to the shape of the coupling grooves S' of the first cover 100*a*, and at least portions of the subsurface portions S12*a* and S12*b* may be wider than stop jaws SP of the coupling grooves S' such that the subsurface portions S12*a* and S12*b* may not be separated, or may resist separation, from the first cover 100*a* owing to the stop jaws SP.

For example, the subsurface portions S12*a* and S12*b* may include: narrow-width portions NPa and NPb forming bottle-neck portions of the first sealing members S1*a* and S1*b* corresponding to the stop jaws SP of the coupling grooves S'; and wide-width portions WPa and WPb wider than the narrow-width portions NPa and NPb. In this case, as shown in FIGS. 4A and 4B, the wide-width portions WPa and WPb may have various shapes such as a trapezoidal cross-sectional shape or a rectangular cross-sectional shape as long as the wide-width portions WPa and WPb are wider than a width between the stop jaws SP for preventing separation from the stop jaws SP. The protruding portions S11*a* and S11*b* may protrude from the first cover 100*a* and make contact with the first end portions 11 of the battery cells 10. The protruding portions S11*a* and S11*b* may be wider than the narrow-width portions NPa and NPb of the subsurface portions S12*a* and S12*b* for forming a large contact area with the first end portions 11 of the battery cells 10.

The first sealing members S1*a* and S1*b* shown in FIGS. 4A and 4B may be formed by an insert molding method as described above with respect to the first sealing member S1 shown in FIG. 3, or may be formed separately from the first cover 100*a* and may then be inserted into the coupling grooves S' of the first cover 100*a*.

The case 100 may accommodate the battery cells 10 and the cooling fluid for cooling the battery cells 10. Here, cooling fluid may refer to a liquid cooling medium having higher thermal capacity and heat-dissipating performance than a gas cooling medium such as air. The cooling fluid may flow in the accommodation space A (refer to FIG. 1) while directly making contact with the battery cells 10, thereby dissipating heat from the surfaces of the battery cells 10. For example, the flow of the cooling fluid in the accommodation space A (refer to FIG. 1) may result in convective heat transfer such that heat may be directly transferred from the battery cells 10.

In an embodiment of the present disclosure, the battery cells 10 may be large battery cells having high output power and high capacity to provide high electrical output power, and thus a relatively large amount of heat may be generated during charging and discharging operations of the battery cells 10. Thus, according to the present disclosure, the cooling fluid may be induced to flow through the accommodation space A (e.g., may be pumped through the accommodation space A), in direct contact with the battery cells 10, to dissipate heat from the battery cells 10, and since the cooling fluid having higher heat capacity than a gas cooling medium such as air is used, heat generated during operations of the battery cells 10 may be smoothly (e.g., consistently, evenly, and/or effectively) dissipated.

In an embodiment of the present disclosure, the battery cells 10 may have a cylindrical shape with a diameter of about 21 mm or greater and a length of about 700 mm or greater. In other embodiments, the battery cells 10 may have a cylindrical shape with a diameter of about 30 mm or greater and a length of about 1000 mm or greater. Heat dissipation through direct contact with the cooling fluid may be effective in smoothly (e.g., consistently, evenly, and/or effectively) dissipating heat from battery cells including those having a diameter of about 30 mm or greater and a length of about 1000 mm or greater, and thus a high-power, high-capacity battery pack may be provided by increasing the size of battery cells 10 to increase the output power of the battery cells 10. However, the scope of the present disclosure is not limited to relatively large battery cells. The inventive concept of the present disclosure may be applied in different applications with different desired output power characteristics. For example, the inventive concept may be applied in applications requiring momentarily high output power, applications involving generation of a large amount of heat based on situations such as battery cells having relatively high internal resistance, and/or applications involving battery cells in which a large amount of heat is characteristically generated.

The cooling fluid may include an electrically insulative fluid or an electrically conductive fluid, and as shown in FIG. 3, insulative layers T may be provided on the outsides of the battery cells 10 that make direct contact with the cooling fluid. For example, the surfaces of the battery cells 10 may have the same polarity as the first end portions 11 or the second end portions 12 of the battery cells 10, and the insulative layers T may be formed on the surfaces of the battery cells 10 to prevent electrical interference between the battery cells 10 occurring due to the flow of the cooling fluid that transfers heat while directly making contact with the battery cells 10.

As shown in FIG. 3, the insulative layers T of the battery cells 10 may be formed in such a manner that the center portions of the first end portions 11 at which electrical connection of the battery cells 10 occurs may be exposed. For example, the insulative layers T may be formed on the entirety of the battery cells 10 except the center portions of the first end portions 11 of the battery cells 10 where electrical connection is made and the center portions of the second end portions 12 of the battery cells 10 where electrical connection is made. That is, the insulative layers T may entirely surround lateral surfaces of the battery cells 10 and may end at the first and second end portions 11 and 12 of the battery cells 10. That is, end positions P1 of the insulative layers T may be on the first and second end portions 11 and 12, and the center portions of the first and second end portions 11 and 12 beyond the end positions P1 of the insulative layers T may be not covered with the insulative layers T but may be exposed for electrical connection therewith.

In the following description, the end positions P1 formed on the first end portions 11 of the battery cells 10 will be mainly described. However, the following description may also be applied to the end positions P1 of the insulative layers T formed on the second end portions 12 of the battery cells 10.

Referring to FIG. 3, the end positions P1 of the insulative layers T may be between the first terminal holes 101' and the second sealing members S2 in the radial direction of the first terminal holes 101'. That is, in some embodiments, the insulative layers T may be formed to extend toward the first terminal holes 101' at most up to the edges of first terminal holes 101', and at least beyond the second sealing members S2.

If the insulative layers T extend to the insides of the first terminal holes 101' and cover the center portions or parts of the center portions of the first end portions 11 of the battery cells 10, the insulative layers T may interfere in electrical connection of the battery cells 10, and if the insulative layers T are not formed up to positions where the permeation of the cooling fluid is doubly blocked by the first and second sealing members S1 and S2, a leak of the cooling fluid may directly make contact with the conductive portions of the battery cells 10, resulting in electrical inference.

The end positions P1 of the insulative layers T may be between the first terminal holes 101' and the second sealing members S2. In an embodiment of the present disclosure, the end positions P1 of the insulative layers T may be located within the thickness (w) of the barrier ribs B corresponding to regions between the first terminal holes 101' and the second sealing members S2. For example, since the barrier ribs B have inner sides surrounding the first terminal holes 101' and outer sides making contact with the second sealing members S2, the end positions P1 of the insulative layers T may be within the thickness (w) of the barrier ribs B between the inner and outer sides of the barrier ribs B.

Figure 5:
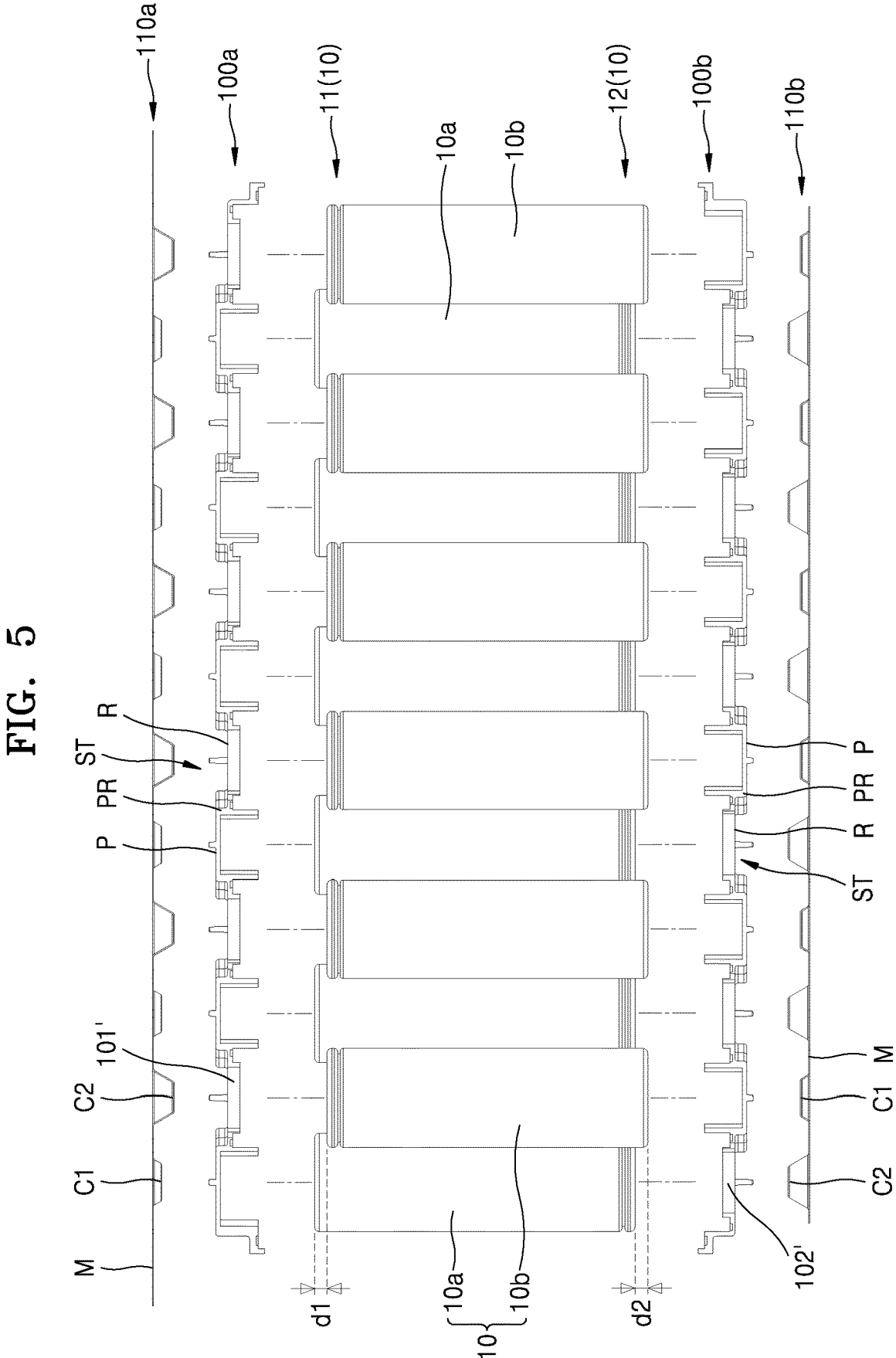
FIG. 5 is a side view illustrating an arrangement of battery cells shown in FIG. 1.

FIG. 5 is a view illustrating an arrangement of the battery cells 10 shown in FIG. 1.

Referring to FIG. 5, the battery cells 10 may include first and second battery cells 10a and 10b that are arranged at offset levels in the length direction of the first and second battery cells 10a and 10b. In this case, the first and second battery cells 10a and 10b may have first end portions 11 adjacent to each other and second end portions 12 adjacent to each other and located opposite the first end portions 11. There may be a first height difference d1 between the first end portions 11 of the first battery cells 10a and the first end portions 11 of the second battery cells 10b. There may be a second height difference d2 between the second end portions 12 of the first battery cells 10a and the second end portions 12 of the second battery cells 10b. Here, the first end portions 11 may refer to end portions of the battery cells 10 facing the first cover 100a, and the second end portions 12 may refer to the other end portions of the battery cells 10 facing the second cover 100b.

Since the first and second battery cells 10a and 10b having the same length are arranged at offset levels in the length direction of the first and second battery cells 10a and 10b, the height difference d1 between the first end portions 11 adjacent to each other may be equal to the height difference d2 between the second end portions 12 adjacent to each other, and the first and second battery cells 10a and 10b may be stepped in opposite directions. For example, the first battery cells 10a having first end portions 11 which protrude relative to those of the second battery cells 10b may have second end portions 12 which are recessed relative to those of the second battery cells 10b, and the second battery cells 10b having first end portions 11 which are recessed relative to those of the first battery cells 10a may have second end portions 12 which protrude relative to those of the first battery cells 10b. That is, when the first end portions 11 of the first battery cells 10a protrude outward more than the first end portions 11 of the second battery cells 10b, the second end portions 12 of the first battery cells 10a may be recessed inward more than the second end portions 12 of the second battery cells 10b by the protruding amount of the first end portions 11 of the first battery cells 10a.

The height difference d1 between the adjacent first end portions 11 of the first and second battery cells 10a and 10b and the height difference d2 between the adjacent second end portions 12 of the first and second battery cells 10a and 10b may, in some embodiments be within the range of about 3 mm to about 12 mm, and in some embodiments may be within the range of about 4 mm to about 10 mm. In some embodiments, as described below, the height difference d1 between the adjacent first end portions 11 and the height difference d2 between the adjacent second end portions 12 may be within the range of about 3 mm or greater, and in some embodiments may be within the range of about 4 mm or greater, to promote or guarantee a sufficient emission passage. In this case, the height difference d1 between the adjacent first end portions 11 and the height difference d2 between the adjacent second end portions 12 may be about 12 mm or less, and in some embodiments may be about 10 mm or less, to prevent a decrease in the energy density of the battery pack caused by excessive values of the height differences d1 and d2.

The first and second battery cells 10a and 10b may be substantially the same battery cells 10 and may be arranged to reverse the polarities of the first and second end portions 11 and 12. That is, the first end portions 11 of the first and second battery cells 10a and 10b may have electrically opposite polarities, and the second end portions 12 of the first and second battery cells 10a and 10b may have electrically opposite polarities (e.g., in the first battery cells 10a, the first end portions 11 may be the negative terminals and the second end portions 12 may be the positive terminals, and in the second battery cells 10b, the second end portions 12 may be the negative terminals and the first end portions 11 may be the positive terminals). In this case, since the first and second battery cells 10a and 10b are arranged such that the first and second end portions 11 and 12 may have opposite polarities and may be at offset levels, the first end portions 11 of the first and second battery cells 10a and 10b may have electrically opposite polarities and may spatially form the height difference d1, and similarly the second end portions 12 of the first and second battery cells 10a and 10b that are adjacent to each other at a side opposite the first end portions 11 may have electrically opposite polarities and may spatially form the height difference d2.

Referring to FIGS. 1 and 5, the first cover 100a may be placed on the first end portions 11 of the first and second battery cells 10a and 10b to cover (or partially cover) the first end portions 11, and the second cover 100b may be placed on the second end portions 12 of the first and second battery cells 10a and 10b to cover (or partially cover) the second end portions 12. The first cover 100a may include recessed height difference spaces ST on an outer side of the first cover 100a corresponding to the regions where the first cover 100a covers the recessed first end portions 11 of the second battery cells 10b (e.g., while extending along the height difference d1 between the first end portions 11 of the first and second battery cells 10a and 10b), and similarly, the second cover 100b may include other recessed height difference spaces ST on an outer side of the second cover 100b corresponding to the regions where the second cover 100b covers the recessed second end portions 12 of the first battery cells 10a.

In the following description, the height difference spaces ST formed on the outer side of the first cover 100a will be mainly described, but the description of the height difference spaces ST may also apply to the height difference spaces ST formed on the outer side of the second cover 100b.

Referring to FIGS. 1 and 5, the first cover 100a may include: protruding portions P and recessed portions R that cover the first end portions 11 of the first and second battery cells 10a and 10b at different levels; and stepped portions PR extending along the height difference d1 between the first end portions 11 of the first and second battery cells 10a and 10b. In addition, the height difference spaces ST corresponding to the height difference d1 between the first end portions 11 of the first and second battery cells 10a and 10b may be formed on outer sides of the recessed portions R (or may be the spaces between the outer sides of the recessed portions R).

In an embodiment of the present disclosure, the protruding portions P may form a high level (e.g., a high region of the face of the first cover 100a), protruding relative to the recessed portions R, to cover the protruding first end portions 11 of the first battery cells 10a, and the recessed portions R may form a low level (e.g., a low region of the face of the first cover 100a), recessed relative to the protruding portions P, to cover the recessed first end portions 11 of the second battery cells 10b. In addition, the stepped portions PR may connect the protruding portions P and the recessed portions R to each other while extending along the height difference d1 between the first end portions 11 of the first and second battery cells 10a and 10b. In this case, the height difference spaces ST may be formed on the outer sides of the recessed portions R (or may be the spaces between the outer sides of the recessed portions R) formed at a low level relative to the protruding portions P.

In the embodiment of the present disclosure shown in FIG. 1, the first and second battery cells 10a and 10b may be arranged in rows, and rows of the first battery cells 10a and rows of the second battery cells 10b may be arranged side by side, at neighboring positions. In an embodiment of the present disclosure, the first and second battery cells 10a and 10b may be cylindrical battery cells and may be arranged in such a manner that the first battery cells 10a may be placed in valleys between the second battery cells 10b neighboring each other, and the second battery cells 10b may be placed in valleys between the first battery cells 10a neighboring each other, thereby decreasing an unnecessary space and increasing the energy density of the battery pack.

The protruding portions P of the first cover 100a may be formed along the rows of the first battery cells 10a having the first end portions 11 that protrude relative to the first end portions 11 of the second battery cells 10b, and may include first terminal holes 101' for electrical connection to the first battery cells 10a. The recessed portions R of the first cover 100a may be formed along the rows of the second battery cells 10b having the first end portions 11 that are recessed relative to the first end portions 11 of the first battery cells 10a, and may include first terminal holes 101' for electrical connection to the second battery cells 10b. Since the height difference spaces ST are formed on the outer sides of the recessed portions R (or the spaces therebetween), the height difference spaces ST may be formed in the shape of channels N (refer to FIG. 1) extending across the first cover 100a along the rows of the second battery cells 10b.

The height difference spaces ST of the first cover 100a may provide emission passages for discharging emission gas from the battery cells 10. For example, the height difference spaces ST of the first cover 100a may be formed on the outer sides of the recessed portions R and may be connected through the first terminal holes 101' to the first end portions 11 of the second battery cells 10b that are recessed in a sunken shape at inner sides of the recessed portions R, thereby providing emission passages for discharging emission gas from the first end portions 11 of the second battery cells 10b.

Figure 6:
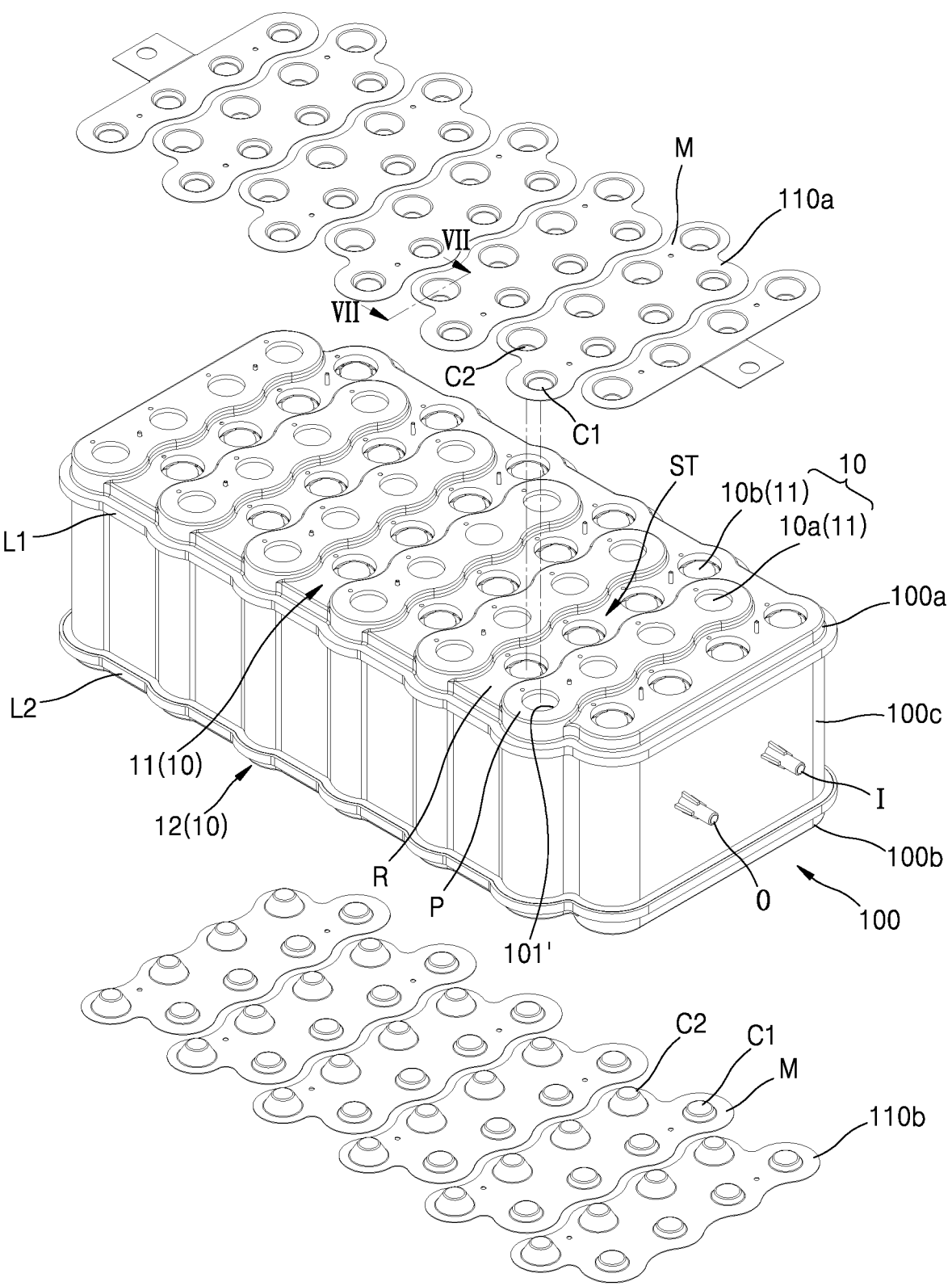
FIG. 6 is an exploded perspective view illustrating height difference spaces of the battery pack shown in FIG. 1.
Figure 7:
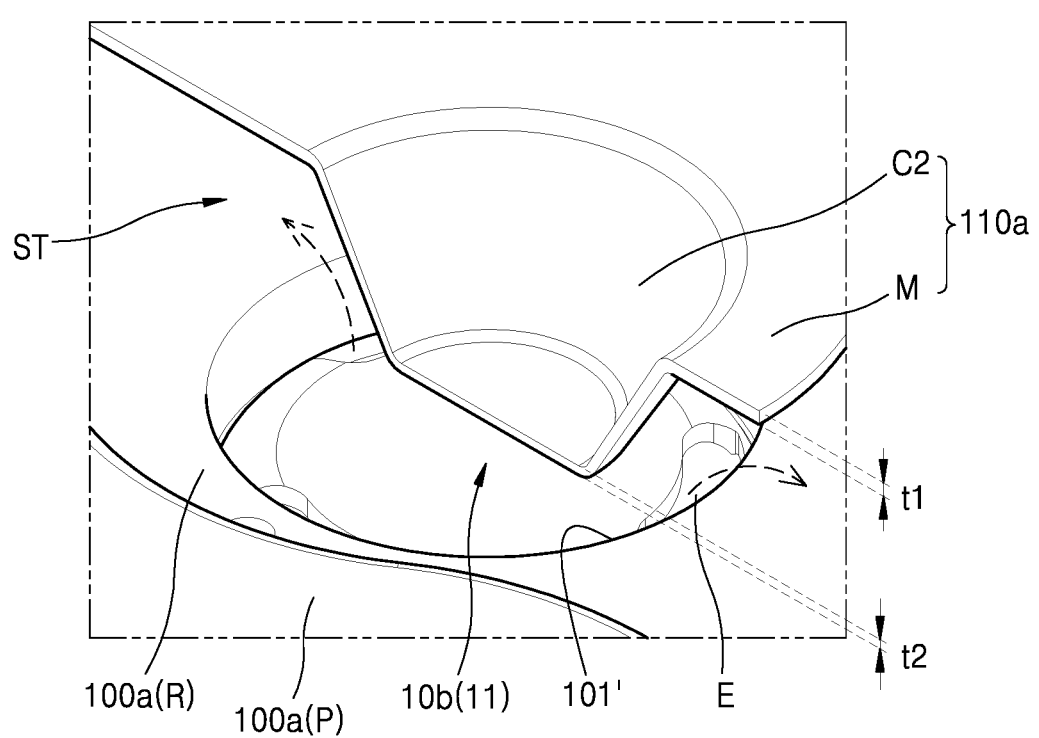
FIG. 7 is a cut-away view taken along line VII-VII in FIG. 6 for illustrating how gas is discharged from a battery cell through a height difference space.

FIG. 6 is a perspective view illustrating the height difference spaces ST of the battery pack shown in FIG. 1. FIG. 7 is a partial cut-away view taken along line VII-VII in FIG. 6 for illustrating how gas is discharged from a battery cell 10 through a height difference space ST.

Referring to FIG. 6, a first tab plate 110a electrically connected to the first end portions 11 of the first and second battery cells 10a and 10b may be placed on (or otherwise coupled to or coupled relative to) the first cover 100a. Referring to FIG. 7, the first tab plate 110a may be connected to a first end portion 11 of a second battery cell 10b through a height difference space ST of the first cover 100a and a first terminal hole 101'. In this case, emission holes E may be formed around a center portion (e.g., at the periphery of the center portion) of the first end portion 11 of the second battery cell 10b which is coupled to the first tab plate 110a. In addition, the emission holes E and the center portion of the first end portion 11 may be exposed through the first terminal hole 101', and the first terminal hole 101' may have a sufficiently large size (for example, diameter) for exposing all the emission holes E and the center portion of the first end portion 11.

The emission holes E may be connected through the first terminal hole 101' to the height difference space ST formed on the outer side of the first cover 100a. For example, emission gas discharged through the first terminal hole 101' may be guided to the outside (e.g., the outside of the case 100) through the height difference space ST between the first cover 100a (for example, a recessed portion R) and the first tab plate 110a, and since the height difference space ST may be considered as being located between the first cover 100a (for example, the recessed portion R) and the first tab plate 110a the height difference space ST provides an emission passage connected to the first terminal hole 101'. In addition, the first end portion 11 of the second battery cell 10b may be a positive electrode side in which the emission holes E are formed.

Referring to FIG. 5, like the first cover 100a, the second cover 100b may extend along the height difference d2 between the second end portions 12 of the first and second battery cells 10a and 10b while covering the second end portions 12 of the first battery cells 10a and the second end portions 12 of the second battery cells 10b. Therefore, the height difference spaces ST corresponding to the height difference d2 between the second end portions 12 may be formed on the outer side of the second cover 100b. In this case, the height difference spaces ST may be formed at the second end portions 12 of the first battery cells 10a that are recessed relative to the second end portions 12 of the second battery cells 10b in a sunken shape.

The height difference spaces ST of the second cover 100b may provide emission passages for discharging emission gas from the battery cells 10. For example, the height difference spaces ST of the second cover 100b may be connected through the second terminal holes 102' to the second end portions 12 of the first battery cells 10a that are recessed in a sunken shape at an inner side of the second cover 100b and may provide emission passages for discharging emission gas from the second end portions 12 of the first battery cells 10a. In this case, other emission holes E may be formed in the second end portions 12 of the first battery cells 10a to discharge emission gas accumulated in the first battery cells 10a, and the second end portions 12 of the first battery cells 10a may be positive electrode sides in which the emission holes E are formed.

As described above, the height difference spaces ST of the first cover 100a may provide emission passages for discharging emission gas from the second battery cells 10b, and the height difference spaces ST of the second cover 100b may provide emission passages for discharging emission gas from the first battery cells 10a. Therefore, emission passages for the first and second battery cells 10a and 10b may be provided or guaranteed by the height difference spaces ST of the first cover 100*a* or the height difference spaces ST of the second cover 100*b*.

In an embodiment of the present disclosure, the first and second battery cells 10*a* and 10*b* are arranged adjacent to each other at offset levels to form the height difference d1 between the first end portions 11 and the height difference d2 between the second end portions 12 of the first and second battery cells 10*a* and 10*b*, and the height difference spaces ST are formed on the first end portions 11 or the second end portions 12 that are recessed relative to their counterparts in a sunken shape to provide emission passages such that emission gas discharged through the first end portions 11 or the second end portions 12 that are recessed in a sunken shape may be discharged to the outside (e.g., the outside of the case 100) through the height difference spaces ST. In this case, the emission holes E may be formed in the first end portions 11 or the second end portions 12 that are recessed in a sunken shape. In an embodiment of the present disclosure, the recessed first end portions 11 of the second battery cells 10*b* and the recessed second end portions 12 of the first battery cells 10*a* may be positive electrode sides of their respective battery cells 10 in which the emission holes E are formed, and the first end portions 11 of the first battery cells 10*a* and the second end portions 12 of the second battery cells 10*b* that protrude in a projecting shape may be negative electrode sides of their respective battery cells 10.

Figure 8:
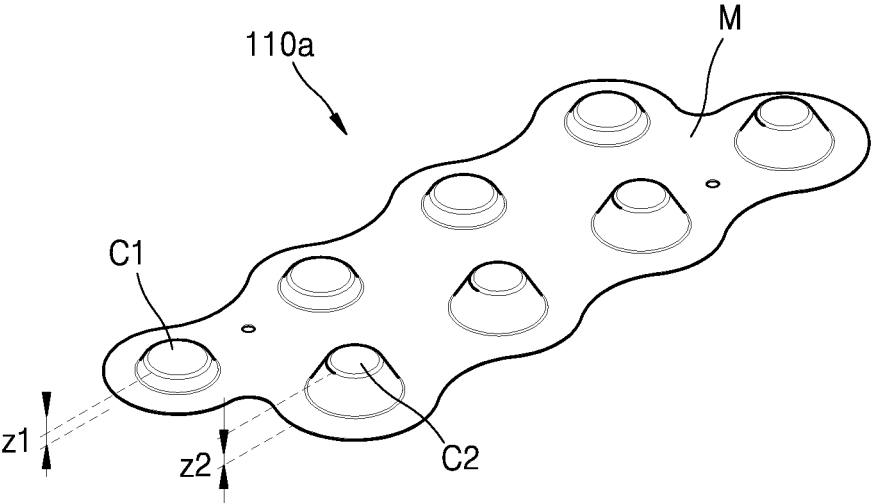
FIG. 8 is a perspective view illustrating a first tab plate shown in FIG. 6.

FIG. 8 is a perspective view illustrating the first tab plate 110*a* shown in FIG. 6.

Referring to FIGS. 6 and 8, the first tab plate 110*a* for electrically connecting the first end portions 11 of the first and second battery cells 10*a* and 10*b* may be placed on (and/or otherwise coupled to or coupled relative to) the outer side of the first cover 100*a*. The first tab plate 110*a* may include: a main portion M having a flat shape and configured to be placed on the first cover 100*a*; and first and second contact portions C1 and C2 protruding toward the first end portions 11 of the first and second battery cells 10*a* and 10*b*, respectively, with different protruding depths.

The main portion M may be placed on the first cover 100*a* and may extend on (e.g., may extend parallel to) the first cover 100*a* in a flat shape. The main portion M may be fixed to a position on the first cover 100*a* owing to the first and second contact portions C1 and C2 coupled to the first end portions 11 of the first and second battery cells 10*a* and 10*b*, respectively.

The first and second contact portions C1 and C2 may make contact with the first end portions 11 of the first and second battery cells 10*a* and 10*b* that are exposed through the first terminal holes 101', and may have sufficient depths for reaching the first end portions 11 of the first and second battery cells 10*a* and 10*b*.

The first contact portions C1 may extend from the main portion M placed on the first cover 100*a* and may be coupled to the protruding first end portions 11 of the first battery cells 10*a* through the first terminal holes 101' formed in the first cover 100*a* (for example, formed in the protruding portions P). The second contact portions C2 may extend from the main portion M placed on the first cover 100*a* and may be coupled to the recessed first end portions 11 of the second battery cells 10*b* through the height difference spaces ST formed on the outer side of the first cover 100*a* (for example, formed on the outer sides of the recessed portions R) and the first terminal holes 101'. As described above, the first and second contact portions C1 and C2 may protrude from the main portion M to different depths and may be coupled to the protruding first end portions 11 of the first battery cells 10*a* and the recessed first end portions 11 of the second battery cells 10*b*, and as shown in FIG. 8, the protruding depth z2 of the second contact portions C2 may be greater than the protruding depth z1 of the first contact portions C1.

The first and second contact portions C1 and C2 are not placed in the same plane as the main portion M but protrude from the main portion M to different depths such that the first and second contact portions C1 and C2 may make contact with the first end portions 11 of the first and second battery cells 10*a* and 10*b* that are arranged in a stepped configuration. The first and second contact portions C1 and C2 protruding from the main portion M placed on the first cover 100*a* are required to have sufficient depths to pass through the first terminal holes 101' for making contact with the first end portions 11 of the first and second battery cells 10*a* and 10*b*.

Each of the first and second contact portions C1 and C2 may be shaped like a truncated cone, for example, having a cross sectional area decreasing in proportion to the protruding depth such that the first and second contact portions C1 and C2 may have radii gradually decreasing in proportion to the protruding depths and may thus be coupled to the first end portions 11 of the first and second battery cells 10*a* and 10*b* when having minimal radii. The first and second contact portions C1 and C2 having cross-sectional radii decreasing in proportion to the protruding depths from the main portion M and being coupled to the center portions of the first end portions 11 of the first and second battery cells 10*a* and 10*b* when the first and second contact portions C1 and C2 have minimal radii may result in the formation of emission passages (e.g., between the first tab plate 110*a* and the first cover 100*a*) coupled to the emission holes E (refer to FIG. 7) formed around the center portions of the first end portions 11.

The first and second contact portions C1 and C2 may be thinner than the main portion M (e.g., where the first tab plate 110*a* is made of one continuous sheet of material, the material may be thinner at the first and second contact portions C1 and C2, or at least at parts of the first and second contact portions C1 and C2, than at the main portion M). The first and second contact portions C1 and C2 may be welded to the first end portions 11 of the first and second battery cells 10*a* and 10*b*, and the first and second contact portions C1 and C2 may be thin enough (e.g., relative to the main portion M) to allow for being sufficiently melted to improve welding strength. The first and second contact portions C1 and C2 may be formed through a forging process or a press forming process in which portions of a raw-material metal sheet are extended downward, and may thus be thinner than the un-forged or un-pressed portions (e.g., the main portion M) because the raw-material metal sheet is extended. For example, as shown in FIG. 7, minimal radius portions of the second contact portions C2 to be welded to the first end portions 11 of the second battery cells 10*b* may have a second thickness t2 less than a first thickness t1 of the main portion M. The first thickness t1 of the main portion M may be large enough to decrease resistance to charging and discharging currents. For example, in some embodiments, the first thickness t1 may be 1 mm or greater and the second thickness t2 may be 0.4 mm or greater. The second thickness t2 may have a minimum thickness of 0.4 mm to facilitate bonding to the first end portions 11 of the second battery cells 10*b* through welding while maintaining its shape and the first thickness t1 may have a minimum thickness of 1 mm to produce the second thickness of 0.4 mm for the portions which are extended through a forging process or a press forming process. In an embodiment of the present disclosure, the first thickness t1 may be 1 mm and the second thickness t2 may be 0.4 mm.

Referring to FIG. 8, a plurality of first contact portions C1 and a plurality of second contact portions C2 may be arranged on the main portion M in rows. In the embodiment of the present disclosure shown in FIG. 6, the first tab plate 110a may connect a row of first battery cells 10a and an adjacent row of second battery cells 10b to each other in such a manner that the first end portions 11 of the first battery cells 10a having the same polarity may be connected together (e.g., resulting in the first battery cells 10a being connected in parallel to each other) and the first end portions 11 of the second battery cells 10b having the same polarity may be connected together (e.g., resulting in the second battery cells 10b being connected in parallel to each other) while the first end portions 11 of the first and second battery cells 10a and 10b having opposite polarities are connected together (e.g., resulting the first battery cells 10a being connected in series with the second battery cells 10b). To connect the battery cells 10a and 10b in series-parallel using the first tab plate 110a as described above, the first tab plate 110a may include a plurality of first contact portions C1 and a plurality of second contact portions C2 to be connected to the first and second battery cells 10a and 10b, and the first and second contact portions C1 and C2 may be arranged in rows according to the first and second battery cells 10a and 10b arranged in rows.

Referring to FIG. 6, a second tab plate 110b for electrically connecting the second end portions 12 of the first and second battery cells 10a and 10b may be placed on the second cover 100b. Like the first tab plate 110a, the second tab plate 110b may include: a main portion M configured to be placed on the second cover 100b; and first and second contact portions C1 and C2 protruding from the main portion M to different depths.

The second tab plate 110b may connect the second end portions 12 of the first battery cells 10a having the same polarity together (e.g., resulting in the first battery cells 10a being connected to each other in parallel), the second end portions 12 of the second battery cells 10b having the same polarity together (e.g., resulting in the second battery cells 10b being connected to each other in parallel), and the second end portions 12 of the first and second battery cells 10a and 10b having different polarities together (e.g., resulting in the first battery cells 10a being connected in series with the second battery cells 10b). To this end, a plurality of first contact portions C1 and a plurality of second contact portions C2 for being respectively connected to the first and second battery cells 10a and 10b may be formed on the second tab plate 110b.

In some embodiments, a plurality of first tab plates 110a and a plurality of second tab plates 110b are arranged such that all of the battery cells 10 in a row are connected with each other in parallel, but each row of battery cells 10 is connected in series with neighboring rows of battery cells 10. For example, where a battery pack includes first and second rows of first battery cells 10a and first and second rows of second battery cells 10b, a first-first tab plate 110a may connect the first ends 11 of the first row of first battery cells 10a with the first ends 11 of the first row of second battery cells 10b; a first-second tab plate 110b may connect the second ends 12 of the first row of second battery cells 10b to the second ends 12 of the second row of first battery cells 10a; and a second-first tab plate 110a may connect the first ends 11 of the second row of first battery cells 10a with the first ends 11 of the second row of second battery cells 10b.

Figure 9:
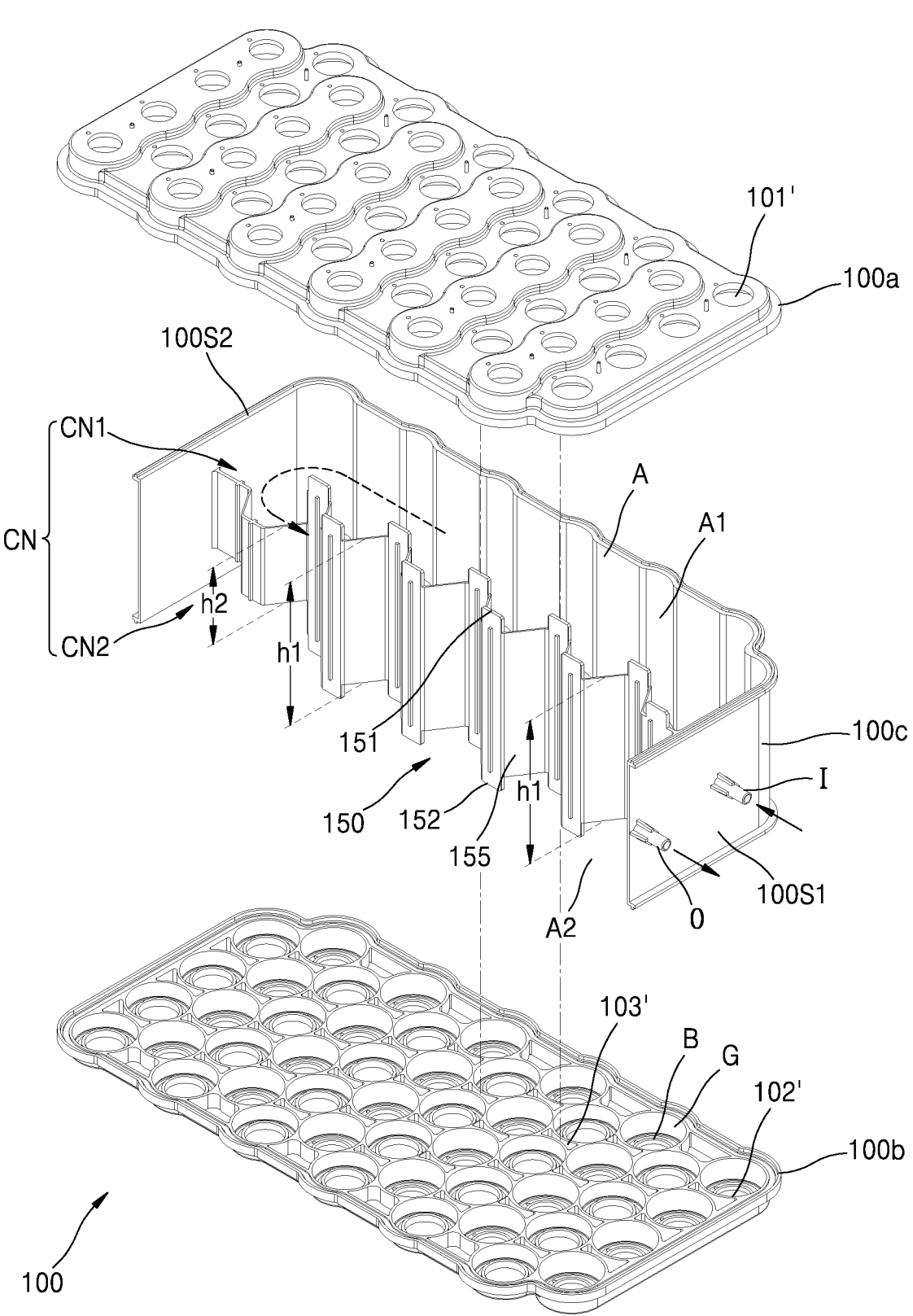
FIG. 9 is an exploded perspective view illustrating a case shown in FIG. 1.
Figure 10:
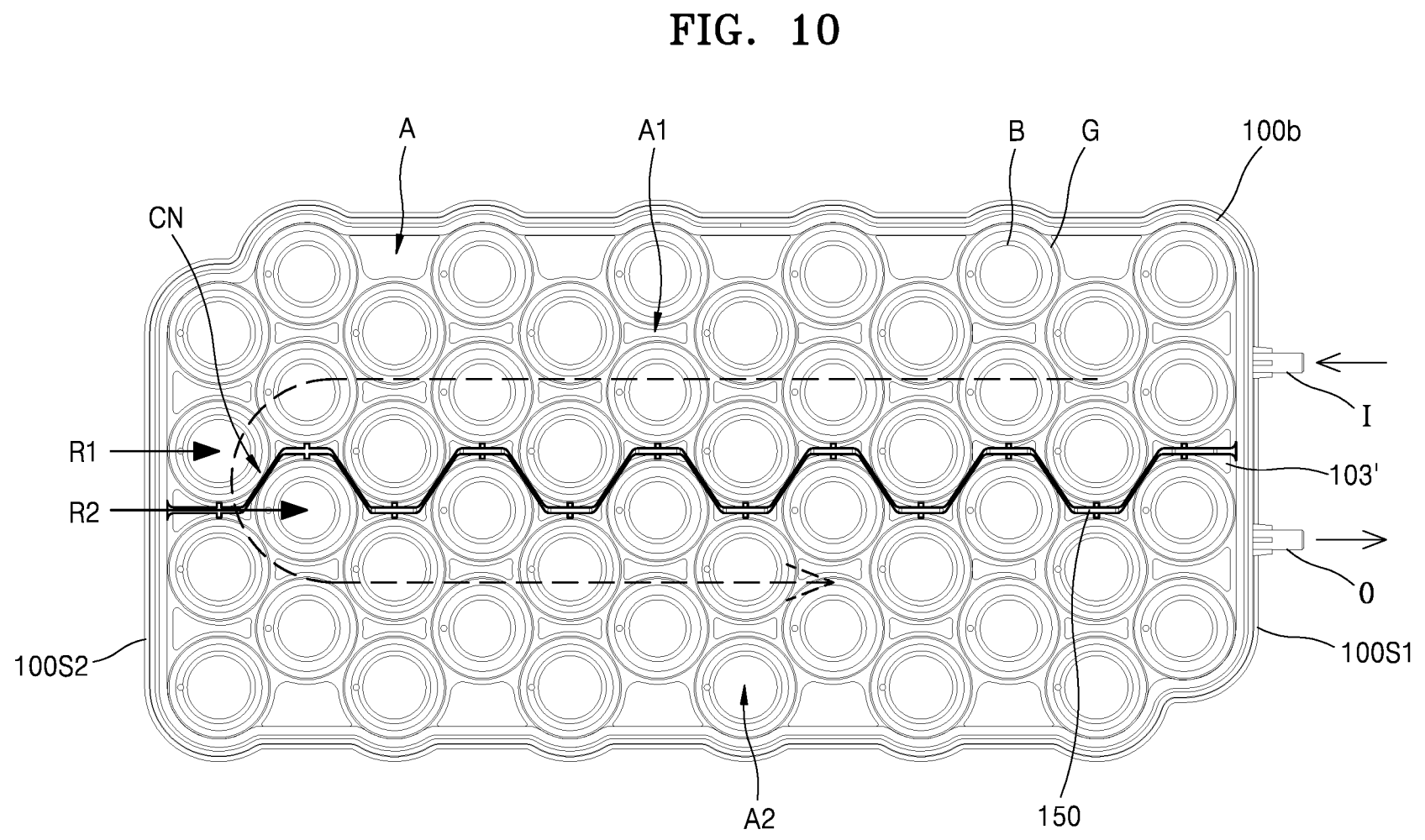

FIG. 9 is an exploded perspective view illustrating the case 100 shown in FIG. 1. FIG. 10 is a view illustrating a flow of the cooling fluid in the case 100 shown in FIG. 9.

Referring to FIGS. 9 and 10, the case 100 may accommodate the battery cells 10 and the cooling fluid for cooling the battery cells 10. The case 100 may include a middle case 100c and the first and second covers 100a and 100b facing each other with the middle case 100c therebetween. The case 100 may be formed in a shape divided into three parts, that is, the middle case 100c and the first and second covers 100a and 100b, and may provide the sealed accommodation space A by coupling the middle case 100c and the first and second covers 100a and 100b to each other. The middle case 100c and the first and second covers 100a and 100b may be coupled to each other by a laser welding method (e.g., may be laser welded together). Thus, a first laser weld zone L1 (refer to FIG. 6) may be formed along boundaries of the middle case 100c and the first cover 100a, and a second laser weld zone L2 (refer to FIG. 6) may be formed along boundaries of the middle case 100c and the second cover 100b. Since the case 100 is formed in a shape divided into three parts—the middle case 100c and the first and second covers 100a and 100b—laser welding may be performed on close positions of the upper and lower portions of the battery pack while adjusting the welding positions in such a manner that the welding positions may be easily exposed to a laser beam emitted in an oblique direction toward the upper and lower portions of the battery pack. Thus, welding may be easily performed.

The middle case 100c and the first and second covers 100a and 100b may be formed by injection molding and may include an engineering plastic material for injection molding and laser welding. For example, the middle case 100c and the first and second covers 100a and 100b may include a polyamide-based material including glass fiber. For example, as optical conditions for performing a laser welding process on a stack of two base materials, the base material which is closer to the point of laser beam emission may need to have transmittance to laser beams of a certain value or greater, and the other base material which is further from the point of laser beam emission may need to have laser beam absorptivity of a certain value or greater. The middle case 100c and the first and second covers 100a and 100b may include a polyamide-based material including glass fiber that satisfies the above optical conditions.

The first and second covers 100a and 100b may cover the first and second end portions 11 and 12 of the battery cells 10, and the middle case 100c may cover the length of or most of the length of the battery cells 10. That is, the middle case 100c may be longer than the first and second covers 100a and 100b in the length direction of the battery cells 10. The middle case 100c may define the accommodation space A while surrounding the peripheries of the battery cells 10 and may be formed in one piece with the barrier wall 150 provided inside the accommodation space A. That is, the middle case 100c and the barrier wall 150 may be formed in one piece through, for example, injection molding.

The case 100 may accommodate a flow of the cooling fluid for cooling the battery cells 10, and the barrier wall 150 may be provided in the case 100 across the accommodation space A to divide the accommodation space A into an upstream area A1 and a downstream area A2. The upstream area A1 may be connected to an inlet I of the cooling fluid such that the cooling fluid may be introduced into the upstream area A1 at a low temperature (e.g., low relative to the temperature of the cooling fluid upon output from the case 100), and the downstream area A2 may be connected to an outlet O of the cooling fluid such that the cooling fluid may be discharged from the downstream area A2 at a high temperature (e.g., relative to the temperature of the cooling fluid upon introduction to the accommodation space A at the inlet I). The inlet I and the outlet O of the cooling fluid may be formed in a side of the accommodation space A (e.g., formed in the wall of the case 100) in an extension direction of the barrier wall 150, and a communication area CN connecting the upstream area A1 and the downstream area A2 to each other may be formed at the other side of the accommodation space A in the extension direction of the barrier wall 150. The communication area CN may connect the upstream area A1 and the downstream area A2 to each other such that cooling fluid may flow from the inlet I to the opposite side of the upstream area A1, then may pass through the communication area CN and flow in the opposite direction through the downstream area A2 to the outlet O.

The inlet I and the outlet O may be formed in an end of the case 100 in the extension direction of the barrier wall 150. For example, both the inlet I and the outlet O may be formed in a first short-side portion 100S1 of the case 100. That is, the inlet I and the outlet O may be formed together in the first short-side portion 100S1, for example, instead of being formed separately in first and second short-side portions 100S1 and 100S2. Accordingly, connection of the cooling fluid to the case 100 may be easily made, as the inlet I and the outlet O may be accessed from the same direction. For example, the case 100 may include: a pair of long-side portions parallel to the extension direction of the barrier wall 150; and the first and second short-side portions 100S1 and 100S2 connecting the pair of long-side portions, and the inlet I and the outlet O may be formed in the first short-side portion 100S1. That is, neither the inlet I nor the outlet O are formed in the second short-side portion 100S2 opposite the first short-side portion 100S1.

In the present disclosure, the inlet I and the outlet O are formed in the first short-side portion 100S1, and the flow of the cooling fluid reverses (e.g., makes a U-turn) at a side of the second short-side portion 100S2 to connect the flow of the cooling fluid from the inlet I to the outlet O using the barrier wall 150. Therefore, relatively large resistance may be applied to the flow of the cooling fluid, and thus the flow of the cooling fluid may be adjusted such that the inside of the case 100 (the accommodation space A) may be fully or almost fully filled with the cooling fluid. If sufficient resistance were not applied to the flow of the cooling fluid, for example, if the cooling fluid flowed in one direction from the first short-side portion 100S1 to the second short-side portion 100S2 of the case 100, the cooling fluid might flow without filling a remote portion such as an upper or corner portion of the case 100 and cause insufficient cooling.

According to embodiments of the present disclosure, the accommodation space A for the battery cells 10 is divided into two parts: the upstream area A1 connected (e.g., directly connected) to the inlet I of the cooling fluid, and the downstream area A2 connected (e.g., directly connected) to the outlet O of the cooling fluid. Therefore, a cross-sectional area (an area from which heat is to be dissipated) through which the cooling fluid flows may be about one half of the cross-sectional area of the accommodation space A, and thus the heat-dissipating performance of the cooling fluid may be improved. If the cooling fluid were to flow in one direction from the first short-side portion 100S1 to the second short-side portion 100S2 of the case 100, the cross-sectional area (the area from which heat is to be dissipated) through which the cooling fluid flowed would be equal to the cross-sectional area of the accommodation space A. Thus, to reduce, by half, the cross-sectional area (the area from which heat is to be dissipated) through which the cooling fluid flows, the pair of the inlet I and the outlet O may be provided at each of the first and second short-side portions 100S1 and 100S2. This may complicate a cooling fluid connection structure and increase the possibility of leakage of the cooling fluid.

In various embodiments of the present disclosure, inlets I and outlets O may be included on the first and/or second short-side portions 100S1 and 100S2 in different numbers. For example, two or more inlets I and two or more outlets O may be included on the first and second short-side portions 100S1 and 100S2. For example, two or more barrier walls 150 may be provided, and an inlet I and an outlet O may be provided in each of regions divided by the two or more barrier walls 150. That is, two or more inlets I and two or more outlets O may be formed, and in this case, the number of the inlets I and the number of the outlets may be different. However, in the embodiment shown in FIG. 9, the inlet I and the outlet O are formed in the first short-side portion 100S1. That is, one inlet I and one outlet O are provided as a pair. In this case, as described above, fluid connection in the case 100 may be easily made, and insufficient cooling may be prevented in a remote region of the case 100 such as an upper or corner region. In addition, the cross-sectional area (the area from which heat is to be dissipated) through which the cooling fluid flows may be reduced, and thus the heat-dissipating performance of the cooling fluid may be improved.

Referring to FIG. 10, the guide ribs G (or the battery cells 10) may be arranged in rows (e.g., row R1 and row R2 as depicted in FIG. 10) in the extension direction of the barrier wall 150, and inside the case 100, the barrier wall 150 may extend through or along a gap between first and second rows R1 and R2 neighboring each other to divide the rows of the guide ribs G (or the battery cells 10) into two groups (e.g., two equally sized groups).

In an embodiment of the present disclosure, the guide ribs G (or the battery cells 10) may be arranged in eight rows in the extension direction of the barrier wall 150, and in this case, the barrier wall 150 may divide the eight rows into two equal groups each including four rows to form the upstream area A1 and the downstream area A2. In this manner, the number of battery cells 10 included in the upstream area A1 is equal or approximately equal to the number of battery cells 10 included in the downstream area A2 such that the heat-dissipating burden on the cooling fluid may be equally distributed in the upstream area A1 and the downstream area A2.

The barrier wall 150 may extend across the gap between the first and second rows R1 and R2 that are adjacent to each other in a state in which the guide ribs G (or the battery cells 10) of the first row R1 are inserted between or partially between the guide ribs G (or the battery cells 10) of the second row R2, and thus the barrier wall 150 may extend in its extension direction while meandering through or along the gap between the first and second rows R1 and R2. For example, the barrier wall 150 may extend in a zigzag pattern along outer surfaces of the guide ribs G (or the battery cells 10) of the first and second rows R1 and R2, and thus the barrier wall 150 may include a plurality of bent portions.

Referring to FIG. 9, the barrier wall 150 may include: a main portion 155 extending across the accommodation space A; and first and second coupling portions 151 and 152 arranged from one end to the other end of the barrier wall 150 in the extension direction of the main portion 155 at intermittent positions which protrude toward the first and second covers 100a and 100b. The first and second coupling portions 151 and 152 may be coupled to the gap portions 103' of the first and second covers 100a and 100b.

The second coupling portions 152 may protrude from the main portion 155 of the barrier wall 150 and make contact with (e.g., couple with) the gap portions 103' of the second cover 100b, and the second coupling portions 152 and the gap portions 103' of the second cover 100b may be welded to each other, for example, by laser welding. Thus, weld zones may be formed on the gap portions 103' of the second cover 100b as a result of welding of the second coupling portions 152. Similarly, the first coupling portions 151 may protrude from the main portion 155 of the barrier wall 150 and make contact with (e.g., couple with) the gap portions 103' of the first cover 100a, and the first coupling portions 151 and the gap portions 103' of the first cover 100a may be welded to each other, for example, by laser welding. Thus, weld zones may be formed on the gap portions 103' of the first cover 100a as a result of welding of the first coupling portions 151. The first and second coupling portions 151 and 152 may be arranged at positions corresponding to each other (e.g., across the main portion 155 from each other) in the extension direction of the barrier wall 150 and may be coupled to the gap portions 103' of the first and second covers 100a and 100b corresponding to the first and second coupling portions 151 and 152.

The barrier wall 150 may be formed in one piece with the middle case 100c. For example, the barrier wall 150 and the middle case 100c may be formed together by injection molding. In this case, the first and second coupling portions 151 and 152 may protrude from the middle case 100c and may be coupled respectively to the gap portions 103' of the first and second covers 100a and 100b.

The main portion 155 of the barrier wall 150 may have different first and second heights h1 and h2 along the extension direction of the barrier wall 150. The main portion 155 of the barrier wall 150 may have the first height h1 along most of the length of the main portion 155 extending from a first end of the middle case 100c in which the inlet I and the outlet O are formed (e.g., the first short-side portion 100S1), and may define the upstream area A1 and the downstream area A2 between the first and second covers 100a and 100b. The first height h1 may be the entire height of the accommodation space A, or nearly the entire height of the accommodation space A, such that the main portion 155 of the barrier wall 150 having the first height h1 may contact or nearly contact the first and second covers 100a and 100b, preventing or reducing the flow of cooling fluid between the upstream area A1 and the downstream area A2 at the portions of the barrier wall 150 having the first height h1. To form the communication area CN connecting the upstream area A1 and the downstream area A2 to each other at a second end of the middle case 100c opposite the first end in which the inlet I and the outlet O are formed (e.g., the second short-side portion 100S2), the main portion 155 of the barrier wall 150 may have the second height h2 at the other end (adjacent the second short-side portion 100S2) which is less than the first height h1 at the first end (the first short-side portion 100S1). Thus, the communication area CN corresponding to the difference between the first and second heights h1 and h2 may be formed. That is, the main portion 155 of the barrier wall 150 may transition from the first height h1 at the first end to the second height h2 at the second end, and the communication area CN may correspond to the difference between the first and second heights h1 and h2 (e.g., may correspond to the area where the height is h2).

As the ratio of the second height h2 to the first height h1 increases, the difference between the first and second heights h1 and h2 decreases, and the size of the communication area CN decreases, thereby increasing resistance to the flow of the cooling fluid and decreasing the velocity of the flow of the cooling fluid (and/or increasing the pressure of the flow of the cooling fluid). However, the mechanical rigidity of the barrier wall 150 increases. Conversely, as the ratio of the second height h2 to the first height h1 decreases, the difference between the first and second heights h1 and h2 increases, and the size of the communication area CN increases, thereby decreasing resistance to the flow of the cooling fluid and increasing the velocity of the flow of the cooling fluid (and/or reducing the pressure of the flow of the cooling fluid). However, the mechanical rigidity of the barrier wall 150 decreases. In accordance with the present disclosure, the ratio of the second height h2 to the first height h1 may be determined to firmly maintain the shape of the barrier wall 150 and impart sufficient rigidity to the barrier wall 150 while considering driving power according to resistance to the flow of the cooling fluid.

In the main portion 155, a section having the second height h2 may be at a middle position of a section having the first height h1 in the height direction of the barrier wall 150, and thus an upper recessed section and a lower recessed section may be formed between the section having the second height h2 and the section having the first height h1. For example, the section having the second height h2 may be recessed to avoid contact with both the first cover 100a and the second cover 100b. In this case, the communication area CN may include a first communication area CN1 corresponding to the upper recessed section adjacent to the first cover 100a, and a second communication area CN2 corresponding to the lower recessed section adjacent to the second cover 100b. In this case, the cooling fluid may smoothly flow between the upstream area A1 and the downstream area A2 through the first and second communication areas CN1 and CN2 that are formed at opposite positions in the height direction of the barrier wall 150. For example, the first communication area CN1 may form a flow of the cooling fluid making contact with sides of the first end portions 11 of the battery cells 10, and the second communication area CN2 may form a flow of the cooling fluid making contact with sides of the second end portions 12 of the battery cells 10. That is, the first and second communication areas CN1 and CN2 may induce or increase a flow of the cooling fluid along the first and second end portions 11 and 12 which may generate more heat than the central portions of the battery cells 10.

In an embodiment of the present disclosure, the communication area CN may be provided as openings corresponding to the difference between the first and second heights h1 and h2 of the main portion 155 of the barrier wall 150. In another embodiment of the present disclosure, the communication area CN may be provided as hole-shaped openings formed in the main portion 155 of the barrier wall 150 such that the cooling fluid may continuously flow from the upstream area A1 to the downstream area A2 (and, e.g., reverse directions between the upstream area A1 and the downstream area A2).

In an embodiment of the present disclosure, the communication area CN may be formed in the main portion 155 of the barrier wall 150. The main portion 155 of the barrier wall 150 may guide the flow of the cooling fluid while extending across the accommodation space A, and thus the communication area CN for reversing the flow of the cooling fluid may be formed in the main portion 155. In another embodiment of the present disclosure, the barrier wall 150 may not include the first and second coupling portions 151 and 152 to be coupled to the first and second covers 100a and 100b. In this case, since the main portion 155 is not distinguished from the first and second coupling portions 151 and 152, it may be considered that the communication area CN is formed in the barrier wall 150.

Figure 11:
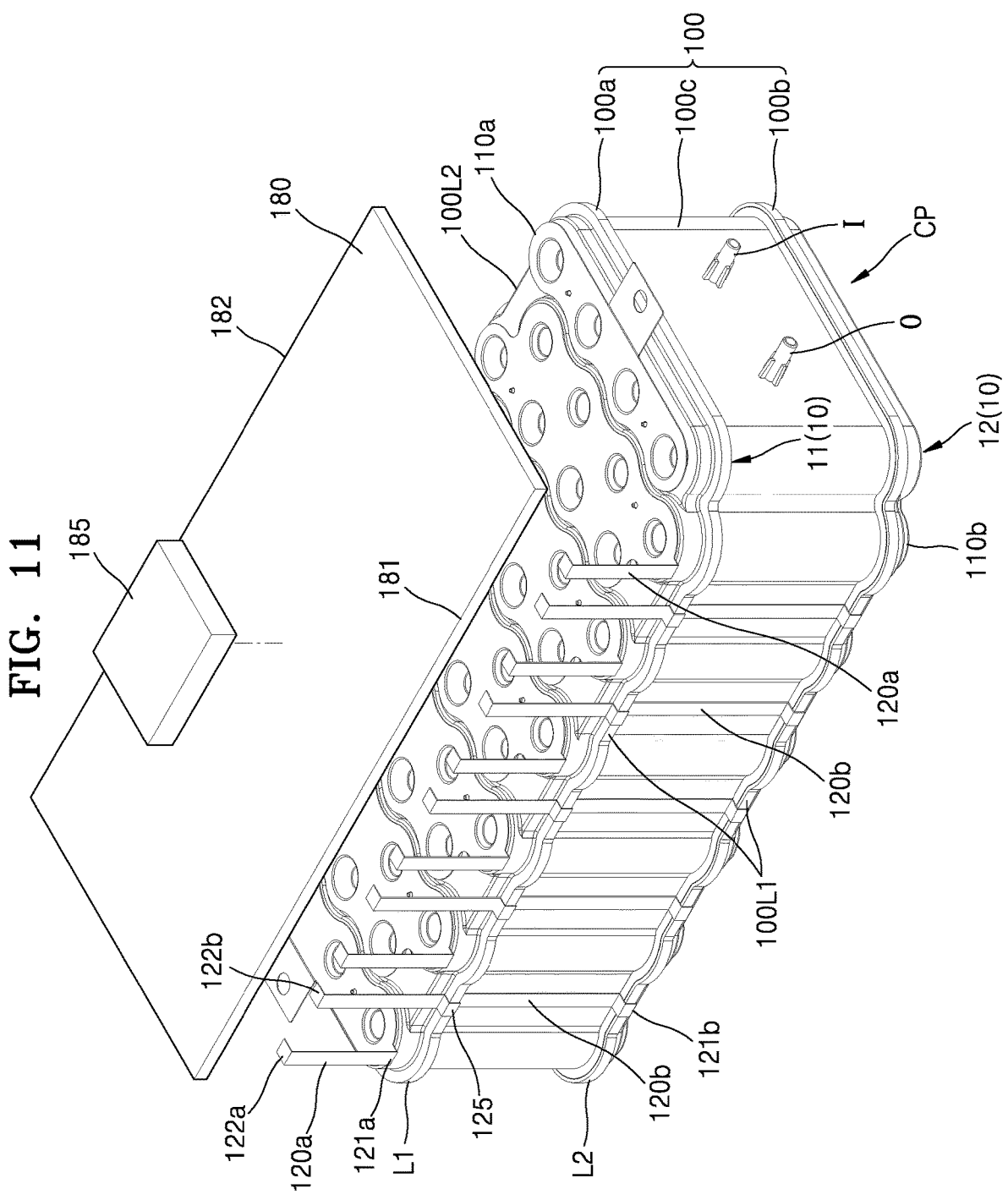
FIG. 11 is a perspective view illustrating connection structures of first and second tab plates shown in FIG. 6.

FIG. 11 is a view illustrating connection structures of the first and second tab plates 110a and 110b shown in FIG. 6.

Referring to FIG. 11, the first tab plate 110a may be placed on the first cover 100a to electrically connect the first end portions 11 of the battery cells 10, and the second tab plate 110b may be placed on the second cover 100b to electrically connect the second end portions 12 of the battery cells 10. A circuit board 180 may be placed on the first tab plate 110a, and the first and second tab plates 110a and 110b may be connected to the circuit board 180. To this end, a first lead 120a may be provided between the circuit board 180 and the first tab plate 110a for electrical connection therebetween, and a second lead 120b may be provided between the circuit board 180 and the second tab plate 110b for electrical connection therebetween. State information about the battery cells 10 transmitted through the first and second tab plates 110a and 110b, such as voltage information (e.g., the voltage of the battery cells 10), may be transmitted to the circuit board 180 through the first and second leads 120a and 120b. The voltage information may be used for controlling charging and discharging operations of the battery cells 10.

The circuit board 180 is placed on the first tab plate 110a and is thus relatively close to the first tab plate 110a and relatively distant from the second tab plate 110b. Therefore, the second lead 120b may extend longer than the first lead 120a. That is, since the second lead 120b extends from the second tab plate 110b placed on the second cover 100b to the circuit board 180 placed above the first cover 100a, the second lead 120b may be longer than the first lead 120a. In this case, the second lead 120b may include bent portions 125 such that the second lead 120b may pass by the first and second laser weld zones L1 and L2 while extending across a lateral side of the case 100 (e.g., while being in direct contact with the lateral side of the case 100, including at laser weld zones L1 and L2). Owing to the bent portions 125, the second lead 120b may extend while making tight contact with the lateral side of the case 100 without physical interference with the first and second laser weld zones L1 and L2 protruding from the lateral side of the case 100. Thus, the second lead 120b may be supported stably without electrical interference with the first lead 120a that could occur if the second lead 120b were to separate from the lateral side of the case 100.

The first and second leads 120a and 120b may be formed separately from the first and second tab plates 110a and 110b and may then be welded to the first and second tab plates 110a and 110b. For example, coupling portions 121a and 121b may be formed on ends of the first and second leads 120a and 120b for coupling with the first and second tab plates 110a and 110b, and connection portions 122a and 122b may be formed on the other (e.g., opposite) ends of the first and second leads 120a and 120b for connection with the circuit board 180. In an embodiment of the present disclosure, the coupling portions 121a and 121b formed on the ends of the first and second leads 120a and 120b and the connection portions 122a and 122b formed on the other ends of the first and second leads 120a and 120b may all be welding portions (e.g., positions for welding of the first and second leads 120a and 120b to their respective contact points).

Where the first and second leads 120a and 120b are formed in one piece with the first and second tab plates 110a and 110b, respectively, instead of forming the first and second leads 120a and 120b separately from the first and second tab plates 110a and 110b, material costs may increase due to metal scrap remaining after a base metal sheet cutting process. In particular, if the second lead 120b which is relatively long is formed in one piece with the second tab plate 110b, a large amount of metal scrap may remain, and thus material costs may excessively increase. In addition, if a bending process is performed on the second lead 120b independently of the second tab plate 110b, the bending process may be easily performed. Therefore, at least the second lead 120b may be formed separately from the second tab plate 110b.

In another embodiment of the present disclosure, the first lead 120a having a relatively short length may extend from the first tab plate 110a after being continuously bent from the first tab plate 110a, and the second lead 120b having a relatively long length may be formed separately from the second tab plate 110b and may then be welded to the second tab plate 110b.

The first lead 120a may include a plurality of first leads 120a extending from a plurality of first tab plates 110a. Similarly, the second lead 120b may include a plurality of second leads 120b extending from a plurality of second tab plates 110b. The first and second leads 120a and 120b may be arranged in an alternating pattern such that the first leads 120a may be placed between the second leads 120b neighboring each other, and the second leads 120b may be placed between the first leads 120a neighboring each other. Since the first and second leads 120a and 120b are arranged in an alternating pattern, electrical interference between the first and second leads 120a and 120b may be prevented, and electrical insulation may be guaranteed between the first and second leads 120a and 120b.

The first and second leads 120a and 120b may be primarily or exclusively arranged along first long-side portions 100L1 of the first and second covers 100a and 100b. For example, when the first and second covers 100a and 100b include first and second long-side portions 100L1 and 100L2 opposite each other, the first and second leads 120a and 120b may be exclusively arranged along the first long-side portions 100L1 of the first and second covers 100a and 100b but may not be arranged on the second long-side portions 100L2 opposite the first long-side portions 100L1. In this case, the first long-side portions 100L1 of the first and second covers 100a and 100b may make contact with the same lateral side of the case 100, for example, the same lateral side of the middle case 100c.

In an embodiment of the present disclosure, the coupling portions 121a and 121b formed on the ends of the first and second leads 120a and 120b, and the connection portions 122a and 122b formed on the other ends of the first and second leads 120a and 120b may all be welding portions, for example, laser welding portions. In this case, since the first and second leads 120a and 120b are primarily or exclusively arranged along the first long-side portions 100L1 of the first and second covers 100a and 100b, laser welding workability may be improved, and a laser beam emission position may not need to be changed from the first long-side portions 100L1 to the second long-side portions 100L2 or the positions of the first and second covers 100a and 100b may not need to be changed during the laser welding process.

In an embodiment of the present disclosure, the first tab plates 110a may connect the first end portions 11 of the first and second battery cells 10a and 10b having opposite polarities, and the second tab plates 110b may connect the second end portions 12 of the first and second battery cells 10a and 10b having opposite polarities, thereby connecting the first battery cells 10a in series with the second battery cells 10b. In this case, the first and second tab plates 110a and 110b may be arranged in a zigzag pattern on the first and second covers 100a and 100b to connect different pairs of the first and second battery cells 10a and 10b, and thus the first and second leads 120a and 120b extending from the first and second tab plates 110a and 110b may also be arranged in an alternating pattern. For example, the first and second tab plates 110a and 110b may be alternatingly arranged along the first long-side portions 100L1 of the first and second covers 100a and 100b, and the first and second leads 120a and 120b extending from the first and second tab plates 110a and 110b may be alternatingly arranged along the first long-side portions 100L1 of the first and second covers 100a and 100b.

Since the first and second leads 120a and 120b are arranged along the first long-side portions 100L1 of the first and second covers 100a and 100b, the connection portions 122a and 122b forming end portions of the first and second leads 120a and 120b may be connected to a first side portion 181 of the circuit board 180. That is, the connection portions 122a and 122b of the first and second leads 120a and 120b may be arranged in a row along the first side portion 181 of the circuit board 180. The expression "the connection portions 122a and 122b of the first and second leads 120a and 120b are arranged in a row" may mean that the connection portions 122a and 122b of the first and second leads 120a and 120b are arranged in one direction along the first side portion 181 of the circuit board 180 without overlapping each other. Here, the first side portion 181 of the circuit board 180 may correspond to an edge portion of the circuit board 180 extending straight and continuously in one direction but not include edge portions extending in different directions. In an embodiment of the present disclosure, the first and second leads 120a and 120b may be primarily or exclusively connected to the first side portion 181 of the circuit board 180 but not connected to a second side portion 182 of the circuit board 180 opposite the first side portion 181.

As described above, since the connection portions 122a and 122b of the first and second leads 120a and 120b are primarily or exclusively connected to the first side portion 181 of the circuit board 180, a conductive path of the circuit board 180 connected to the first and second leads 120a and 120b may be shortened. For example, the conductive path may be shortened by placing a circuit for processing data transmitted through the first and second leads 120a and 120b at a position close to the first side portion 181 of the circuit board 180.

The connection portions 122a and 122b of the first and second leads 120a and 120b may be arranged in an alternating pattern along the first side portion 181 of the circuit board 180. Since the first and second leads 120a and 120b are arranged in an alternating pattern, the connection portions 122a and 122b forming end portions of the first and second leads 120a and 120b may be arranged in an alternating pattern along the first side portion 181 of the circuit board 180.

The circuit board 180 may receive information about states of the battery cells 10 through the first and second leads 120a and 120b and may control charging and discharging operations of the battery cells 10 based on the state information. The circuit board 180 may be provided on the first tab plates 110a on a side of the first cover 100a. That is, the circuit board 180 may be provided on a side of the first cover 100a instead of being provided on a side of the middle case 100c.

The first tab plates 110a may be directly connected to the first end portions 11 of the battery cells 10 which are making contact with the cooling fluid and may be in thermal contact with the cooling fluid through the first cover 100a with which the first tab plates 110a make tight contact. Thus, the circuit board 180 placed on the first tab plates 110a may be cooled through the first tab plates 110a.

Like the first tab plates 110a, the second tab plates 110b may be directly connected to the second end portions 12 of the battery cells 10 which are making contact with the cooling fluid and may be in thermal contact with the cooling fluid through the second cover 100b with which the second tab plates 110b make tight contact. According to the present disclosure, the first and second tab plates 110a and 110b at which heat may be generated due to a concentration of charging and discharging currents may be cooled by the cooling fluid flowing in the case 100. Therefore, the temperature of the first and second tab plates 110a and 110b may be lowered to decrease the electrical resistance of charging and discharging passages, and circuit components mounted on the circuit board 180 may be cooled through the first tab plates 110a. Although not shown in the drawings, according to an embodiment of the present disclosure, an insulative member may be placed between the first tab plates 110a and the circuit board 180 to guarantee insulation therebetween.

Figure 12:
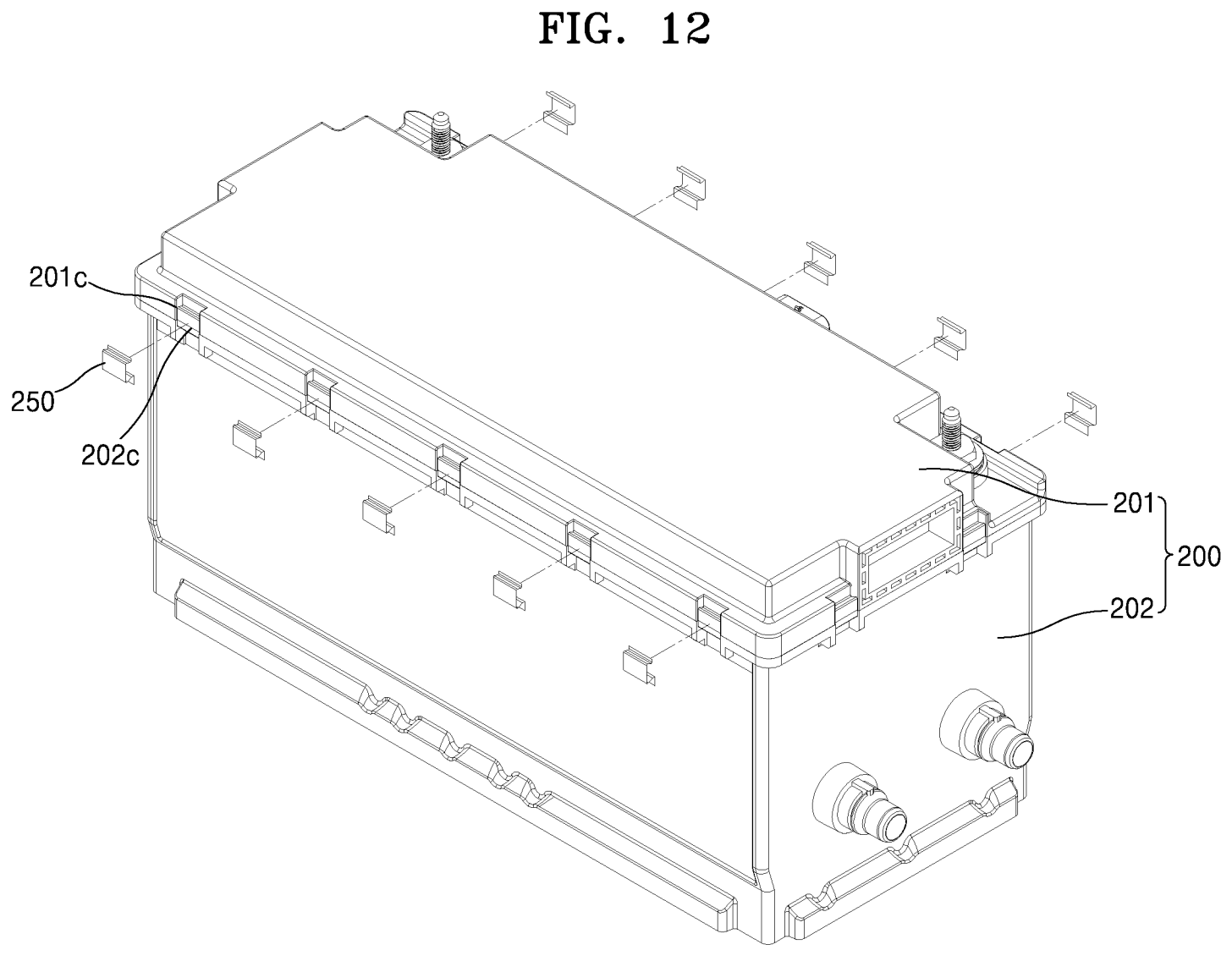

FIG. 12 is an exploded perspective view illustrating a housing accommodating a core pack shown in FIG. 11, according to an embodiment of the present disclosure.

Referring to FIGS. 11 and 12, according to an embodiment of the present disclosure, a battery pack may include: a core pack CP including a case 100 in which a plurality of battery cells 10 are accommodated, a circuit board 180 being mounted on an outside of the core pack CP; and a housing 200 accommodating the core pack CP. In addition, the housing 200 may include a housing main body 202 and a housing cover 201 that face each other and are coupled to each other with the core pack CP therebetween.

The housing main body 202 and the housing cover 201 may include different materials. For example, the housing main body 202 may include a metallic material such as aluminum, and the housing cover 201 may include a resin material allowing for the housing cover 201 to be formed through injection molding. The housing main body 202 and the housing cover 201 may be coupled to each other in a mutually-facing direction with the core pack CP therebetween. The housing main body 202 and the housing cover 201 including different materials may be coupled to each other by one or more clipping structures. For example, clip recesses 201c and 202c to which clips 250 may be fitted may be formed in the housing cover 201 and the housing main body 202, respectively, and after aligning the clip recesses 201c and 202c of the housing cover 201 and the housing main body 202 with each other, the clips 250 may be fitted to the clip recesses 201c and 202c adjoining each other to couple the housing cover 201 and the housing main body 202 to each other.

The housing main body 202 may provide a space in which the core pack CP is entirely or mostly accommodated, and the housing cover 201 may cover an open upper portion of the housing main body 202 to seal the space. The housing main body 202 may include a metallic material such as aluminum or an aluminum alloy to provide or guarantee structural rigidity of the battery pack and heat-dissipating performance, and an electric device packed with an insulative material such as a relay 185 (refer to FIG. 11) packed with an insulative resin may be placed on a side of the circuit board 180 facing the housing main body 202 for electrical insulation between the circuit board 180 and the housing main body 202. According to an embodiment of the present disclosure, the core pack CP shown in FIG. 11 may be accommodated in the housing main body 202 in a standing state such that the circuit board 180 may face a lateral side of the housing main body 202, and in such a case, the circuit board 180 and the housing main body 202 may be insulated (e.g., electrically insulated) from each other owing to the relay 185 (refer to FIG. 11) packed with the insulative resin placed between the circuit board 180 and the lateral side of the housing main body 202.

In some embodiments according to the present disclosure, a battery pack such as those discussed above may be incorporated within a motor vehicle. For example, the battery pack may be used in place of a conventional starting, lighting, and ignition (SLI) battery. In some embodiments, the vehicle may be an electric vehicle and the battery pack may be separate from the electric vehicle battery used for propulsion of the vehicle. The battery pack may be configured to receive the cooling fluid from the cooling system of the vehicle. That is, the inlet I and the outlet O may be coupled to the cooling system of the vehicle to allow vehicle coolant to enter through the inlet I, remove heat from the battery cells 10, and exit the battery back through the outlet O to rejoin the vehicle cooling system.

According to the present disclosure, a flow of the cooling fluid making direct contact with the surfaces of the battery cells 10 is induced in the accommodation space A, and thus heat-dissipating performance may be improved because heat is directly transferred from the battery cells 10 by convection. In particular, according to the present disclosure, a sealing structure is provided to prevent leakage of the cooling fluid from the accommodation space A in which the battery cells 10 are located.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims and equivalents thereof.

What is claimed is:

1. A battery pack comprising:
a plurality of battery cells each comprising a first end portion and a second end portion that correspond to opposite ends in a length direction of a respective battery cell of the plurality of battery cells, each battery cell comprising an insulative layer on an outer surface thereof;

a case having an accommodation space in which each of the plurality of battery cells is located, the accommodation space being configured to contain a cooling fluid for cooling the plurality of battery cells, the case comprising a first cover covering the first end portion of a battery cell of the plurality of battery cells, the first cover comprising a first terminal hole through which the first end portion of the battery cell of the plurality of battery cells is exposed; and first and second sealing members adjacent to the first end portion of the battery cell of the plurality of battery cells, the first and second sealing members surrounding the first terminal hole and configured to block gaps between the first cover and the first end portion of the battery cell of the plurality of battery cells to prevent cooling fluid leaving the accommodation space through the first terminal hole, wherein an end of the insulative layer at the first end portion of the battery cell of the plurality of battery cells is between the first terminal hole and the second sealing member, and wherein the insulative layer extends to the first end portion of the battery cell of the plurality of battery cells while surrounding an entire side surface of the battery cell of the plurality of battery cells for providing electrical insulation from the cooling fluid and the insulative layer is terminated at the first end portion of the battery cell of the plurality of battery cells.

2. The battery pack of claim 1, wherein the first sealing member is around the first terminal hole, and
the second sealing member is between the first terminal hole and the first sealing member in a radial direction of the first terminal hole.

3. The battery pack of claim 1, wherein the insulative layer is on the outer surface of the battery cell of the plurality of battery cells to provide electrical insulation between the battery cell of the plurality of battery cells and the cooling fluid.

4. The battery pack of claim 3, wherein the insulative layer extends to have the end on the first end portion of the battery cell of the plurality of battery cells.

5. The battery pack of claim 4, wherein the end of the insulative layer is between the first terminal hole and the second sealing member in a radial direction of the first terminal hole.

6. The battery pack of claim 1, wherein an inlet and an outlet for introducing and discharging the cooling fluid are on the case, and
the accommodation space of the case accommodates a flow of the cooling fluid making direct contact with the plurality of battery cells.

7. The battery pack of claim 1, wherein the first end portion of the battery cell of the plurality of battery cells comprises a terminal of the battery cell of the plurality of battery cells.

8. The battery pack of claim 1, wherein the case is configured to receive the cooling fluid from a motor vehicle cooling system, and wherein the battery pack is configured to power a motor vehicle.

* * * * *